(12) United States Patent
Cho

(10) Patent No.: US 7,304,436 B2
(45) Date of Patent: Dec. 4, 2007

(54) GENERATOR FOR SUSTAINING PULSE OF PLASMA DISPLAY PANEL

(75) Inventor: Jang Hwan Cho, Kumi-shi (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 10/305,095

(22) Filed: Nov. 27, 2002

(65) Prior Publication Data

US 2003/0099122 A1 May 29, 2003

(30) Foreign Application Priority Data

Nov. 29, 2001 (KR) .................... 10-2001-0075115

(51) Int. Cl.
*H02M 7/122* (2006.01)

(52) U.S. Cl. .................. 315/167; 315/169.1; 363/58

(58) Field of Classification Search ............... 363/98, 363/58, 40, 41, 55; 315/167, 169.1, 169.2, 315/169.3, 169.4
See application file for complete search history.

(56) References Cited

U.S. PATENT DOCUMENTS

| | | | |
|---|---|---|---|
| 3,618,071 A * | 11/1971 | Johnson et al. | 345/70 |
| 3,913,036 A | 10/1975 | Hook | 331/113 |
| 4,100,535 A * | 7/1978 | Bitzer et al. | 345/60 |
| 4,277,728 A * | 7/1981 | Stevens | 315/307 |
| 4,626,979 A | 12/1986 | JaQuay | 363/41 |
| 5,381,076 A * | 1/1995 | Nerone | 315/209 R |
| 5,585,920 A | 12/1996 | Roedel et al. | 356/307 |
| 5,666,279 A | 9/1997 | Takehara et al. | 363/95 |
| 5,900,701 A * | 5/1999 | Guhilot et al. | 315/307 |
| 5,969,484 A * | 10/1999 | Santi et al. | 315/247 |
| 5,994,848 A * | 11/1999 | Janczak | 315/224 |
| 6,011,355 A * | 1/2000 | Nagai | 315/169.3 |
| 6,069,801 A * | 5/2000 | Hodge et al. | 363/21.02 |
| 6,072,856 A | 6/2000 | Van Der Broeck et al. | 378/101 |
| 6,259,615 B1 | 7/2001 | Lin | 363/98 |
| 6,351,401 B1 * | 2/2002 | Scheel et al. | 363/98 |
| 6,366,474 B1 * | 4/2002 | Gucyski | 363/20 |
| 6,384,579 B2 * | 5/2002 | Watanabe | 320/166 |
| 6,465,990 B2 * | 10/2002 | Acatrinei et al. | 323/222 |

FOREIGN PATENT DOCUMENTS

FR 2 693 603 1/1994

OTHER PUBLICATIONS

Turchi, J., "Corriger le Facteur de Puissance Avec Peu de Composants," Electronique CEP Communication, Paris, France, Sep. 2000 No. 106, pp. 88-90, XP-001128562.
Search Report issued by the European Patent Office—Munich.

* cited by examiner

*Primary Examiner*—Bao Q. Vu
(74) *Attorney, Agent, or Firm*—Ked & Associates, LLP

(57) ABSTRACT

It is disclosed that there is a sustaining pulse generator of a plasma display panel capable of simplifying a circuit configuration thereof.

A sustaining pulse generator of a plasma display panel according to an embodiment of the present invention includes a DC converter for converting AC voltage to DC voltage; a switching part for switching the DC voltage to convert into square wave; a transformer for inducing the square wave to an output terminal thereof connected to a panel; and a rectifier for rectifying the square wave induced to the output terminal to apply to the panel.

30 Claims, 20 Drawing Sheets

GENERATOR FOR SUSTAINING PULSE OF PLASMA DISPLAY PANEL

BACKGROUND OF THE INVENTION

1. Field of the Invention

This invention relates to a sustaining pulse generator of a plasma display panel, and more particularly to a sustaining pulse generator of a plasma display panel that is capable of simplifying a circuit configuration thereof.

2. Description of the Related Art

Generally, a plasma display panel (PDP) radiates a fluorescent body by an ultraviolet with a wavelength of 147 nm generated during a discharge of He+Xe or Ne+Xe gas to thereby display a picture including characters and graphics. Such a PDP is easy to be made into a thin-film and large-dimension type. Moreover, the PDP provides a very much improved picture quality owing to a recent technical development.

Such a PDP drives one frame, which is divided into various sub-fields having a different emission frequency, so as to realize gray levels of a picture. Each sub-field is again divided into a reset interval for uniformly causing a discharge, an address interval for selecting the discharge cell and a sustaining interval for realizing the gray levels depending on the discharge frequency. When it is intended to display a picture of 256 gray levels, a frame interval equal to 1/60 second (i.e. 16.67 msec) in each discharge cell is divided into 8 sub-fields SF1 to SF8. Each of the 8 sub-fields SF1 to SF8 is divided into a reset interval, an address interval and a sustaining interval.

The reset interval and the address interval of each sub-field are equal every sub-field. A voltage difference between a data electrode and a scanning electrode causes an address discharge to select cells. The sustaining interval increases in proportion of $2^n$ (wherein n=0, 1, 2, 3, 4, 5, 6 and 7) at each sub-field. The gray levels necessary for displaying a picture can be realized by controlling the sustaining discharge frequency of the sustaining interval in each sub-field. The sustaining discharge is caused by a sustaining pulse of high voltage alternately applied to the scanning electrode and a sustaining electrode.

Referring to FIG. 1, a sustaining pulse generator for generating a sustaining pulse of a PDP according to the related art includes an AC input unit 1 supplying AC voltage, a Power Factor Correction PFC unit 10 improving the power factor of the voltage applied from the AC input unit 1 and eliminating harmonics, a DC/DC converter 20 converting DC voltage generated at the PFC unit 10 into square wave and at the same time transforming it, and a sustaining pulse supplier 30 applying the square wave of the transformed DC voltage to a PDP panel 40.

The PFC unit 10 controls input current from the AC input unit to generate sine waves with the same phases, improve power factor and at the same time eliminate harmonics noise.

To this end, the PFC unit 10, as in FIG. 2, includes a rectifying circuit 12 rectifying the AC inputted from the AC input unit 1 to DC, and a power factor correction circuit 14 improving the power factor of the DC rectified at the rectifying circuit 12.

The rectifying circuit 12 includes a first diode DF1 and a second diode DF2 arranged in a full bridge type and being forward biased during a positive (+) half period of the inputted AC, and a third diode DF3 and a fourth diode DF4 being forward biased during a negative (−) half period. The rectifying circuit 12 does full wave rectification to the AC inputted from the AC input unit 1 and stores the produced DC at a smoothing capacitor 2C.

The power factor correction circuit 14 includes a coil 2L being charged with a current component of the DC stored at the smoothing capacitor 2C of the rectifying circuit 12, a first transistor 2T1 installed between the coil 2L and the rectifying circuit 12 and switching for the current component of the DC to be stored at the coil 2L, and a first capacitor Cdc1 being charged with a voltage component of the DC applied from the smoothing capacitor 2C by switching of the first transistor 2T1.

When a control signal (not shown) turns on the first transistor 2T1, there is a loop formed between the smoothing capacitor 2C, the first transistor 2T1 and the coil 2L and the current component of the DC is stored at the coil 2L. Further, when the control signal (not shown) turns off the first transistor 2T1, the voltage component of the DC stored at the smoothing capacitor 2C is stored at the first capacitor Cdc1.

There is a diode Do installed between the coil 2L and the first capacitor Cdc1 in the power factor correction circuit 14 for shutting off reverse current from the first capacitor Cdc1 to the coil 2L.

Referring to FIG. 3, the DC/DC converter 20 includes a bridge switch 22 connected to both ends of the first capacitor Cdc1 of the PFC unit 10, a center tap transformer 3T transforming the voltage applied by the switching of the bridge switch 22, a second capacitor 3C2 and a first inductor 3L1 connected in series between the center tap transformer 3T and the bridge switch 22, a full wave rectifier 24 connected to a secondary winding of the center tap transformer 3T and rectifying the voltage induced to the center tap transformer 3T, a smoothing capacitor 3Cdc2 being charged with the voltage outputted from the full wave rectifier 24, and the second inductor 3L2 arranged in series between the smoothing capacitor 3Cdc2 and the full wave rectifier 24.

The bridge switch 22 consists of a first to a fourth switches 3Q1, 3Q2, 3Q3 and 3Q4 arranged in a full bridge type at both ends of the first capacitor Cdc1.

The first and third switches 3Q1 and 3Q3 are connected in parallel with one end of the first capacitor Cdc1, and the second and fourth switches 3Q2 and 3Q4 are connected in parallel with the other end of the first capacitor Cdc1. Herein, the first to fourth switches 3Q1, 3Q2, 3Q3 and 3Q4 are Field Effect Transistors FET.

There are a first node 3N1 connected to the first and fourth switches 3Q1 and 3Q4, and a second node 3N2 connected to the second and third switches 3Q2 and 3Q3. The first node 3N1 is connected to the upper end of a primary winding of the center tap transformer 3T through the second capacitor 3C2 and the first inductor 3L1, and the second node 3N2 is connected to the lower end of the primary winding of the center tap transformer 3T. The bridge switch 22 converts the voltage applied from the first capacitor Cdc1 by the alternate switching of the first to fourth switches 3Q1, 3Q2, 3Q3 and 3Q4 to apply to the primary winding of the center tap transformer 3T.

The second capacitor 3C2 is a DC blocking capacitor for preventing a current with a DC component applied to the center tap transformer 3T via the bridge switch 22.

The first inductor 3L1 is a resonant coil for eliminating switching loss of the first to fourth switches 3Q1, 3Q2, 3Q3 and 3Q4 of the bridge switch 22.

The center tap transformer 3T insulates the primary winding and the secondary winding and converts the input voltage. In other words, the center tap transformer 3T transforms the voltage applied from the primary winding to the secondary winding by a turn-ratio between the primary winding and the secondary winding. The center tap transformer 3T induces the voltage from the primary winding to the secondary winding by the turn-ratio between the primary winding and the secondary winding The one end of the primary winding of the center tap transformer 3T is connected to the first inductor 3L1, the other end of the primary winding to the second node 3N2.

The full wave rectifier 24 includes a first diode 3D1 arranged between both ends of the secondary winding of the center tap transformer 3T and a second diode 3D2 arranged between the first diode 3D1 and a positive (+) terminal of the center tap transformer 3T in order to rectify the AC pulse induced to the secondary winding of the center tap transformer 3T.

The second diode 3D2 rectifies the positive square wave induced between the positive (+) terminal and a center tap of the secondary winding and applies it to the smoothing capacitor 3Cdc2 through the second inductor 3L2. The first diode 3D1 rectifies the negative square wave induced between the center tap and the negative (−) terminal of the secondary winding and applies it to the smoothing capacitor 3Cdc2 through the second inductor 3L2. Herein, the second inductor 3L2 acts to smooth the square wave, which is rectified by the first and second diodes 3D1 and 3D2, to DC.

The DC/DC converter 20 has the same circuit configuration as an ordinary DC/DC converter, and the voltage stored at the smoothing capacitor 3Cdc2 of the DC/DC converter 20 is applied to the sustaining pulse supplier 30.

The sustaining pulse supplier 30 includes a third capacitor 3C3 for eliminating ripple of the voltage applied from the smoothing capacitor 3Cdc2, and a fifth switch 3Q5 and a sixth switch 3Q6 connected in parallel with both ends of the third capacitor 3C3.

The third capacitor 3C3 is connected in parallel with the smoothing capacitor 3Cdc2 of the DC/DC converter 20. The third capacitor 3C3 compensates the ripple generated by line resistance when the voltage is applied from the smoothing capacitor 3Cdc2.

The fifth and sixth switches 3Q5 and 3Q6 switches to allow the DC voltage stored at the third capacitor 3C3 to be applied to a panel capacitor Cp. Herein, the fifth and sixth switches 3Q5 and 3Q6 are Field Effect Transistors FET.

In the sustaining pulse generator according to the related art, after the first switch 3Q1 is turned on by the switching control signal (not shown), the second switch 3Q2 is turned on so that the voltage of the first capacitor Cdc1 flows via the first switch 3Q1, the second capacitor 3C2, the first inductor 3L1, the primary winding of the center tap transformer 3T and the second switch 3Q2. Accordingly, the voltage stored at the first capacitor Cdc1 is made to induce a positive voltage +SUS to the secondary winding of the center tap transformer 3T. The positive voltage +SUS induced to the secondary winding is rectified into a positive sustaining pulse by the second diode 3D2 and stored at the smoothing capacitor 3Cdc2 and the third capacitor 3C3 to be applied to the panel capacitor Cp.

Subsequently, the first and second switches 3Q1 and 3Q2 are turned off, then the third switch 3Q3 is turned on by a switching control signal (not shown), then the fourth switch 3Q4 is turned on. With this, the voltage of the first capacitor Cdc1 flows the third switch 3Q3, the primary winding of the center tap transformer 3T, the first inductor 3L1, the second capacitor 3C2, the fourth switch 3Q4. Accordingly, the voltage stored at the first capacitor Cdc1 is made to induce a negative voltage −SUS to the secondary winding of the center tap transformer 3T. The negative voltage −SUS induced to the secondary winding is rectified into a positive sustaining pulse by the first diode 3D1 and applied to the panel capacitor Cp through the smoothing capacitor 3Cdc2 and the third capacitor 3C3.

In this way, because the conventional sustaining pulse generator converts the AC input voltage into the sustaining pulse through the PFC unit 10, the DC/DC converter 20 and the sustaining pulse supplier 30, it increases circuit loss such as conduction loss and switching loss etc in many circuit devices in the course of conversion. In addition, a cost for fabricating the circuit increases due to the complexity of the circuit.

SUMMARY OF THE INVENTION

Accordingly, it is an object of the present invention to provide a sustaining pulse generator of a plasma display panel with a simplified circuit configuration.

In order to achieve these and other objects of the invention, a sustaining pulse generator of a plasma display panel according to an aspect of the present invention includes a DC converter for converting AC voltage to DC voltage; a switching part for switching the DC voltage to convert into square wave; a transformer for inducing the square wave to an output terminal thereof connected to a panel; and a rectifier for rectifying the square wave induced to the output terminal to apply to the panel.

Herein, the DC converter includes a plurality of diodes connected between an input voltage source and the switching part in a bridge type; a first capacitor connected between the diodes of a bridge type and the switching part; a power factor correction circuit connected between the first capacitor and the switching part; and a second capacitor connected between the power factor correction circuit and the switching part.

The second capacitor includes a third capacitor and a fourth capacitor connected between the power factor correction circuit and the switching part in parallel.

The switching part includes a plurality of transistors connected between the second capacitor and the transformer in a bridge type.

The switching part includes a first transistor connected between the third capacitor and the transformer; and a second transistor connected between the first transistor and the fourth capacitor.

The switching part includes a third capacitor and a fourth capacitor connected between the second capacitor and the transformer in parallel.

The sustaining pulse generator of the PDP further includes a smoothing capacitor connected between the switching part and the transformer.

The sustaining pulse generator of the PDP further includes an inductor connected between the smoothing capacitor and the transformer.

The rectifier includes a plurality of diodes connected between the transformer and the panel in a bridge type.

The diodes includes a first diode connected to both ends of the output terminal of the transformer; and a second diode connected to the first diode and the output terminal of the transformer.

The rectifier includes a diode connected between the transformer and the panel.

The transformer includes a first center tap connected to an input terminal of the transformer; and a second center tap connected to the output terminal.

The first center tap is connected to the second capacitor and the second center tap is connected to the panel.

A sustaining pulse generator of the PDP according to another aspect of the present invention includes a DC converter for converting AC voltage to DC voltage; a sensor for sensing a level of the AC voltage; a switching part for converting the DC voltage into square wave; a transformer for inducing the square wave to an output terminal thereof connected to a panel; a controller for controlling a turn-ratio of the transformer in accordance with the sensed AC voltage level; and a rectifier for rectifying the square wave induced to the output terminal to apply to the panel.

Herein, the DC converter includes a plurality of diodes connected between an input power source and the switching part in a bridge type; a first capacitor connected between the diodes of a bridge type and the switching part; a power factor correction circuit connected between the first capacitor and the switching part; and a second capacitor connected between the power factor correction circuit and the switching part.

The transformer includes an auxiliary winding.

The auxiliary winding is connected to any one between a primary winding and a secondary winding of the transformer.

Herein, the controller includes a first switch connected between the auxiliary winding and the primary winding; a second switch connected between the auxiliary winding and the switching part and being operated together with the first switch; and a third switch connected between the auxiliary winding and the primary winding and connecting the auxiliary winding and the primary winding in series.

Herein, the controller includes a first switch connected between the auxiliary winding and the secondary winding; a second switch connected between the auxiliary winding and the rectifier and being operated together with the first switch; and a third switch connected between the auxiliary winding and the secondary winding and connecting the auxiliary winding and the secondary winding in series.

A sustaining pulse generator of the PDP according to still another aspect of the present invention includes a DC converter for converting AC voltage to DC voltage; a switching part for switching the DC voltage to convert into square wave; a transformer for inducing the square wave to an output terminal thereof connected to a panel; a sensor for sensing an output voltage of the transformer; a voltage stabilizer disposed between the DC converter and the transformer for sustaining an input voltage of the transformer uniform; a controller for controlling the voltage stabilizer in accordance with the sensed output voltage of the transformer; and a rectifier for rectifying the square wave induced to the output terminal to apply to the panel.

Herein, the DC converter includes a plurality of diodes connected between an input power source and the switching part in a bridge type; a first capacitor connected between the diodes of a bridge type and the switching part; a power factor correction circuit connected between the first capacitor and the switching part; and a second capacitor connected between the power factor correction circuit and the switching part.

The voltage stabilizer is a buck circuit connected between the second capacitor and the switching part.

Herein, the buck circuit further includes a switch connected between the second capacitor and the switching part; an inductor connected between the switch and the switching part; a third capacitor connected between the inductor and the switching part; and a diode connected between the third capacitor and a node between the switch and the inductor.

A sustaining pulse generator of the PDP according to still another aspect of the present invention includes a sustaining driving circuit that inverts a polarity of square wave and rectifies the square wave to generate a sustaining waveform of at least two steps or more.

Herein, the sustaining driving circuit further includes a first driver connected a first electrode of a panel for applying the sustaining waveform to the first electrode; and a second driver connected a second electrode of the panel for applying a sustaining waveform with an opposite phase to the sustaining waveform to the second electrode.

Herein, the first driver includes a first DC converter for converting AC voltage into DC voltage; a first switching part for switching the DC voltage to convert into square wave; a first transformer for inducing the square wave to an output terminal thereof connected to the panel; and a first rectifier for rectifying the square wave induced to the output terminal to apply to the first electrode of the panel.

Herein, the second driver includes a second DC converter for converting AC voltage into DC voltage; a second switching part for switching the DC voltage to convert into square wave; a second transformer for inducing the square wave to an output terminal thereof connected to the panel; and a second rectifier for rectifying the square wave induced to the output terminal to apply to the second electrode of the panel.

The sustaining waveform has three steps of a positive potential, a ground potential and a negative potential.

BRIEF DESCRIPTION OF THE DRAWINGS

These and other objects of the invention will be apparent from the following detailed description of the embodiments of the present invention with reference to the accompanying drawings, in which.

DETAILED DESCRIPTION OF THE PREFERRED EMBODIMENT

Reference will now be made in detail to the preferred embodiments of the present invention, examples of which are illustrated in the accompanying drawings.

Figure 1:
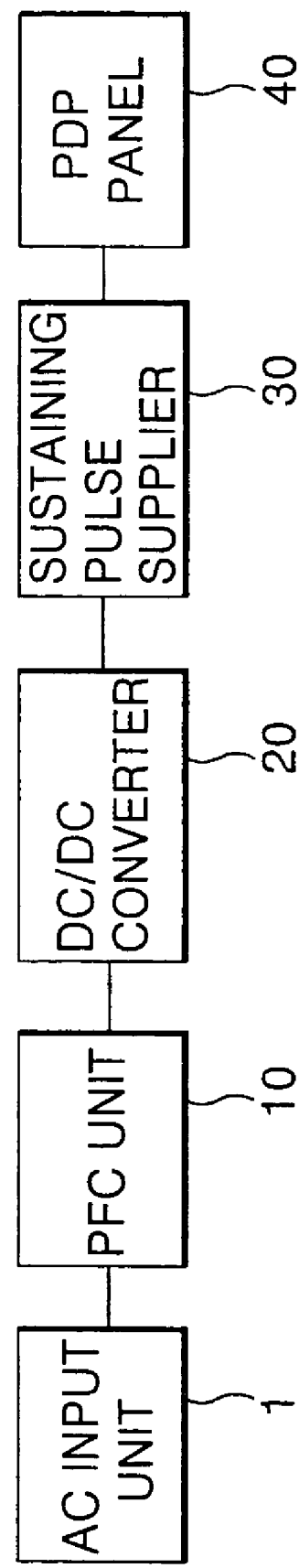
FIG. 1 illustrates a block diagram of a sustaining pulse generator according to the related art.
Figure 2:
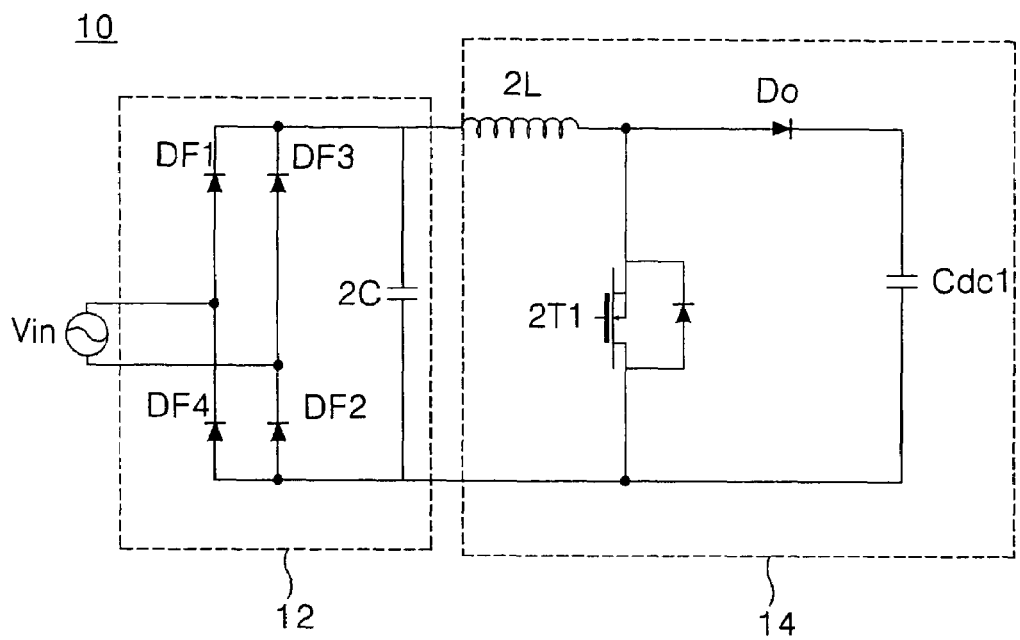
FIG. 2 illustrates a detailed circuit diagram of a power factor correction circuit shown in FIG. 1.
Figure 3:
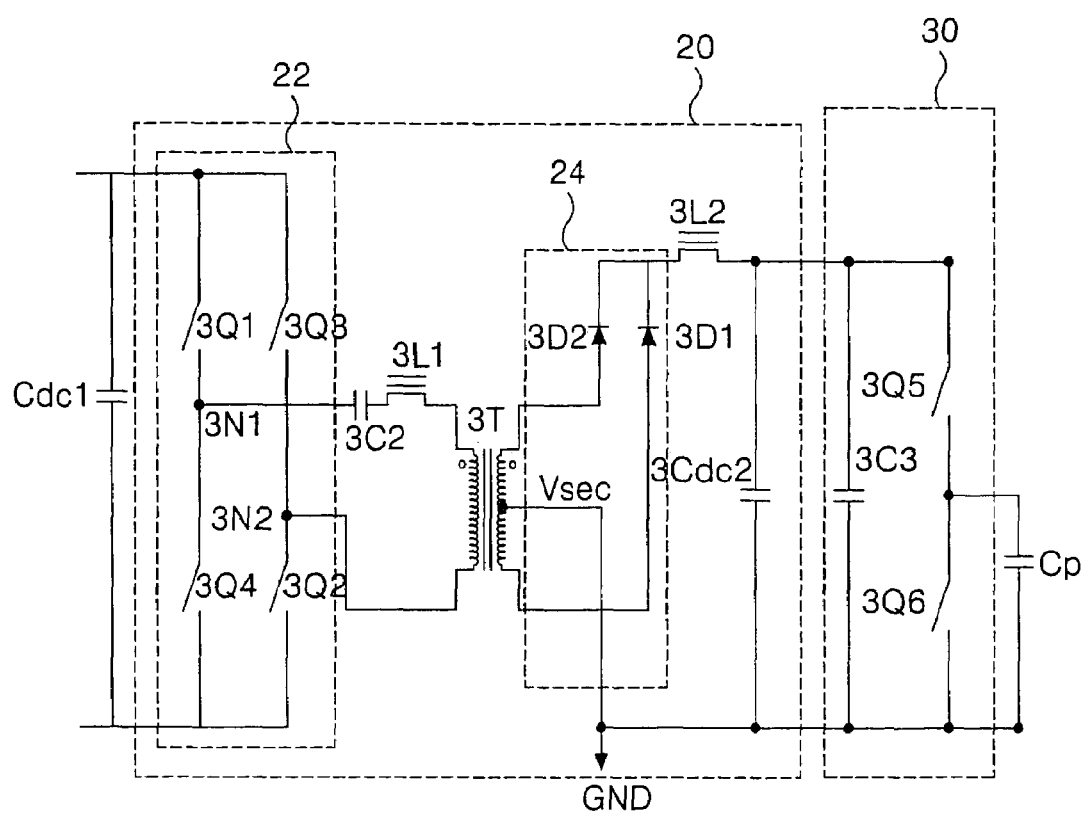
FIG. 3 illustrates a detailed circuit diagram of a sustaining pulse generator of a PDP, shown in FIG. 1, according to related art.
Figure 4:
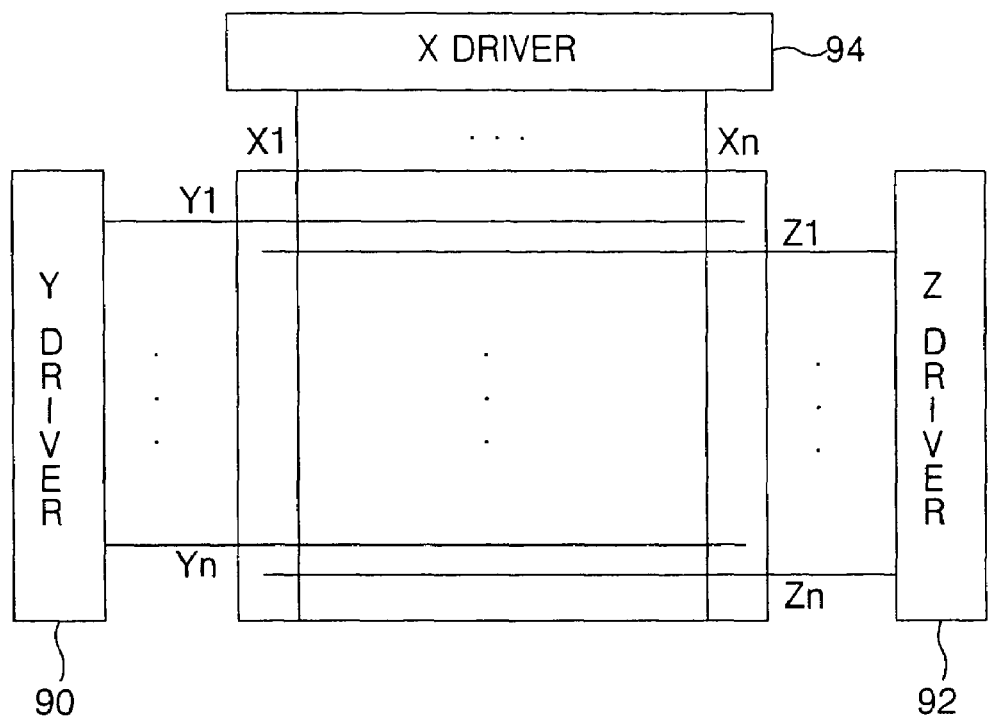
FIG. 4 illustrates a block diagram of a driver of a plasma display panel according to an embodiment of the present invention.

Referring to FIG. 4, a driving apparatus of a plasma display panel PDP according to the present invention includes a Y driver 90 driving scanning/sustaining electrode lines Y1 to Ym, a Z driver 92 driving common sustaining electrode lines Z1 to Zm, and an X driver 94 driving address electrode lines X1 to Xn.

The Y driver 90 sequentially applies scanning pulses and sustaining pulses to the scanning/sustaining electrode lines Y1 to Ym simultaneously. The Z driver 92 applies sustaining pulses to the common sustaining electrode lines Z1 to Zm simultaneously. The X driver 94 applies data pulses synchronized with the scanning pulses to the address electrode lines X1 to Xn.

Figure 5:
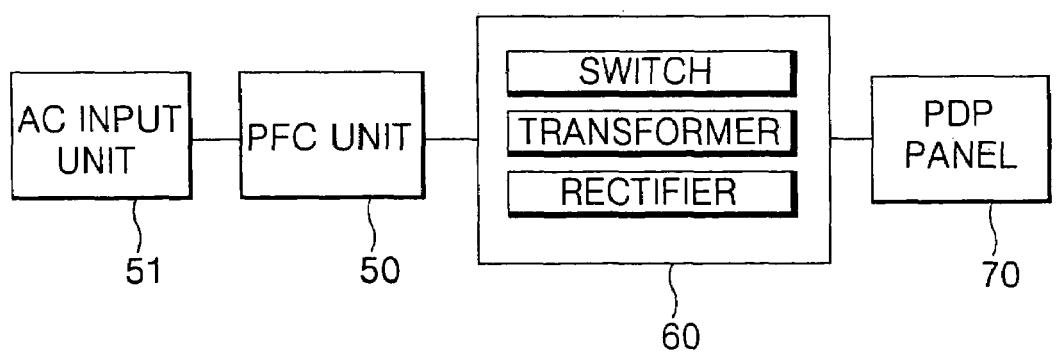
FIG. 5 illustrates a block diagram of a sustaining pulse generator of Y and Z drivers each shown in FIG. 4.

The Y driver 90 and the Z driver 92 each generates the sustaining pulses by a sustaining pulse generator shown in FIG. 5.

Referring to FIG. 5, the sustaining pulse generator of the PDP according to the embodiment of the present invention includes an AC input unit 51 applying AC voltage, a power factor correction PFC unit 50 improving power factor of the voltage applied from the AC input unit 51 and eliminating harmonics, and a DC/DC converter 60 converting the DC voltage generated at the PFC unit 50 into square wave, transforming it, rectifying it, and then applying it to a PDP panel 70.

The PFC unit 50 controls input current from the AC input unit 51 to generate sine waves with the same phases, improve power factor and at the same time eliminate harmonics noise.

Figure 6A:
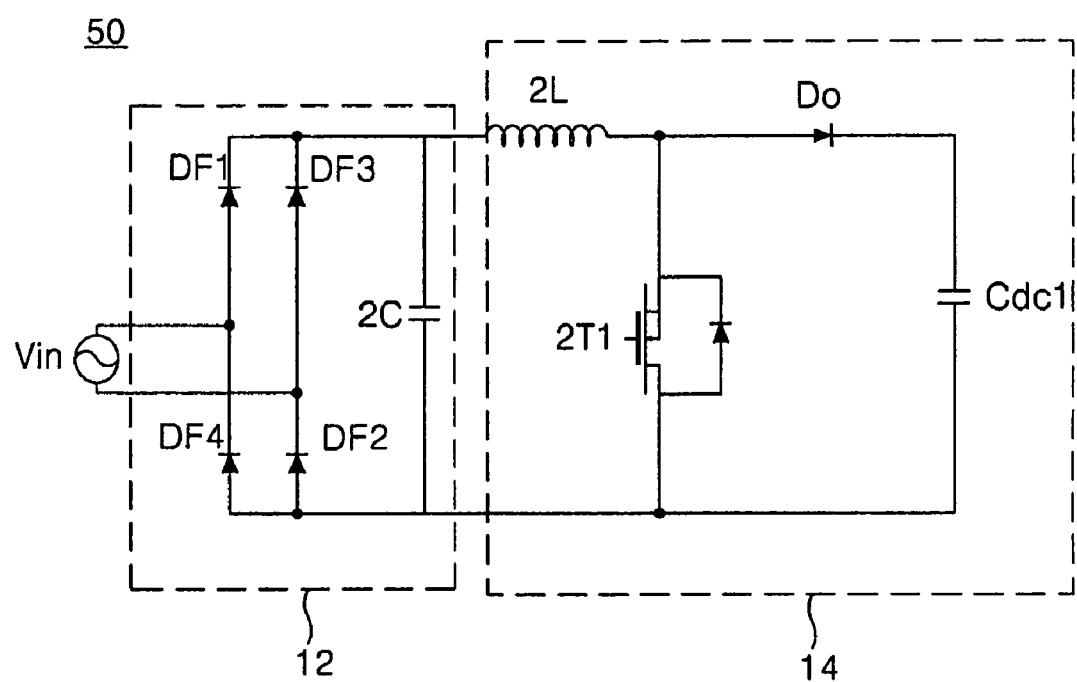
FIG. 6A illustrates a detailed circuit diagram of a power factor correction unit according to an embodiment of the present invention.

To this end, the PFC unit 50, as in FIG. 6A, includes a rectifying circuit 12 rectifying the AC inputted from the AC input unit 51 to DC, and a power factor correction circuit 14 improving the power factor of the DC rectified at the rectifying circuit 12.

The rectifying circuit 12 includes a first diode DF1 and a second diode DF2 arranged in a full bridge type and being forward biased during a positive (+) half period of the inputted AC, and a third diode DF3 and a fourth diode DF4 being forward biased during a negative (−) half period. The rectifying circuit 12 does full wave rectification to the AC inputted from the AC input unit 51 and stores the produced DC at a smoothing capacitor 2C.

The power factor correction circuit 14 includes a coil 2L being charged with a current component of the DC stored at the smoothing capacitor 2C of the rectifying circuit 12, a first transistor 2T1 installed between the coil 2L and the rectifying circuit 12 and switching for the current component of the DC to be stored at the coil 2L, and a first capacitor Cdc1 being charged with a voltage component of the DC applied from the smoothing capacitor 2C by switching of the first transistor 2T1.

When A control signal (not shown) turns on the first transistor 2T1, there is a loop formed between the smoothing capacitor 2C, the first transistor 2T1 and the coil 2L and the current component of the DC is stored at the coil 2L. Further, when the control signal (not shown) turns off the first transistor 2T1, the voltage component of the DC stored at the smoothing capacitor 2C is stored at the first capacitor Cdc1.

There is a diode Do installed between the coil 2L and the first capacitor Cdc1 in the power factor correction circuit 14 for shutting off reverse current from the first capacitor Cdc1 to the coil 2L.

Figure 6B:
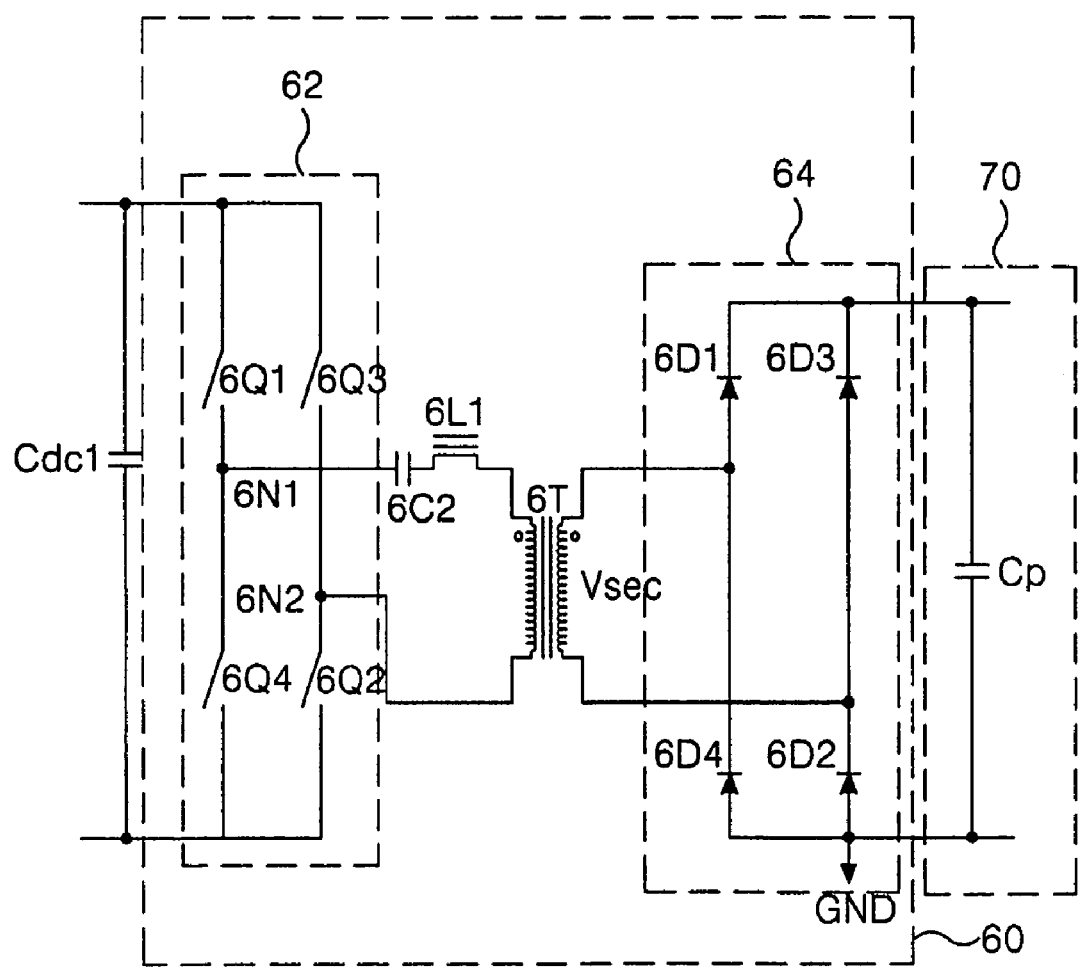
FIG. 6B illustrates a circuit diagram of a sustaining pulse generator of a PDP according to the first embodiment of the present invention.

Referring to FIG. 6B, the DC/DC converter 60 according to the first embodiment of the present invention includes a bridge switch 62 connected to both ends of the first capacitor Cdc1 at which output voltage of the PFC unit 50 is stored, a transformer 6T connected to the bridge switch 62 and converting the square wave applied by the switching of the bridge switch 62, a second capacitor 6C2 and a first inductor 6L1 connected in series between the transformer 6T and the bridge switch 62, and a bridge rectifier 64 of full bridge type connected to a secondary winding of the transformer 6T.

The bridge switch 62 consists of a first to a fourth switches 6Q1, 6Q2, 6Q3 and 6Q4 arranged in a full bridge type at both ends of the first capacitor Cdc1.

The first and third switches 6Q1 and 6Q3 are connected in parallel with one end of the first capacitor Cdc1, and the second and fourth switches 6Q2 and 6Q4 are connected in parallel with the other end of the first capacitor Cdc1. Herein, the first to fourth switches 6Q1, 6Q2, 6Q3 and 6Q4 are Field Effect Transistors FET.

There are a first node 6N1 connected to the first and fourth switches 6Q1 and 6Q4, and a second node 6N2 connected to the second and third switches 6Q2 and 6Q3. The first node 6N1 is connected to the upper end of a primary winding of the transformer 6T through the second capacitor 6C2 and the first inductor 6L1, and the second node 6N2 is connected to the lower end of the primary winding of the transformer 6T. Herein, the first and second switches 6Q1 and 6Q2 are switched at the same time, or the second switch 6Q2 is switched after the first switch 6Q1 is switched. The third and fourth switches 6Q3 and 6Q4 are switched at the same time, or the fourth switch 6Q4 is switched after the third switch 6Q3 is switched.

The bridge switch 62 converts the voltage applied from the first capacitor Cdc1 by the alternate switching of the first to fourth switches 6Q1, 6Q2, 6Q3 and 6Q4 to square wave to apply to the primary winding of the transformer 6T.

The second capacitor 6C2 is a DC blocking capacitor for preventing a current with a DC component applied to the transformer 6T via the bridge switch 62.

The first inductor 6L1 is a resonant coil for eliminating switching loss of the first to fourth switches 6Q1, 6Q2, 6Q3 and 6Q4 of the bridge switch 62.

The transformer 6T insulates the primary winding and the secondary winding and transforms the input voltage. In other words, the transformer 6T transforms the voltage applied to the primary winding and has the transformed voltage out to the secondary winding by a turn-ratio between the primary winding and the secondary winding. The one end of the primary winding of the transformer 6T is connected to the first inductor 6L1, the other end of the primary winding to the second node 6N2.

The bridge rectifier 64 includes a first diode to a fourth diode 6D1, 6D2, 6D3 and 6D4 connected in a full bridge type to both ends of the secondary winding of the transformer 6T in order to rectify the polarity of the AC pulse induced to the secondary winding of the transformer 6T.

The first and second diodes 6D1 and 6D2 rectifies the positive (+) AC pulses induced to the secondary winding of the transformer 6T into positive sustaining pulses. The third and fourth diodes 6D3 and 6D4 rectifies the negative (−) AC pulses induced to the secondary winding of the transformer 6T into positive sustaining pulses. The positive sustaining pulses rectified by the bridge rectifier 64 are applied to a panel capacitor Cp.

Figure 7:
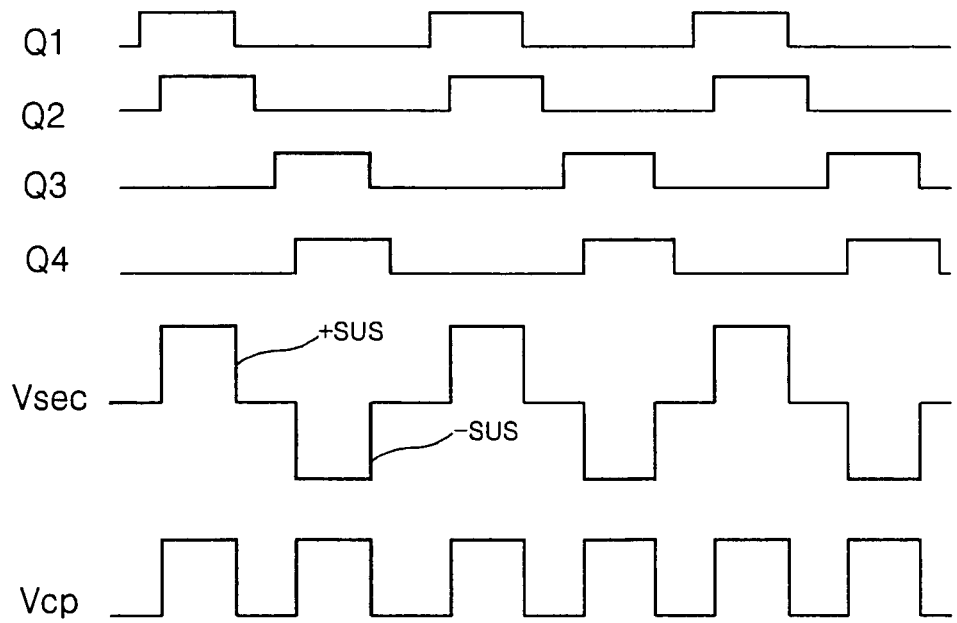
FIG. 7 illustrates a driving waveform diagram of the sustaining pulse generator of the PDP shown in FIG. 6.

The operation of the sustaining pulse generator of the PDP according to the first embodiment of the present invention is described as follows in conjunction with FIG. 7.

After the first switch 6Q1 is turned on by the switching control signal, the second switch 6Q2 is turned on so that the voltage of the first capacitor Cdc1 flows via the first switch 6Q1, the second capacitor 6C2, the first inductor 6L1, the primary winding of the transformer 6T and the second switch 6Q2. Accordingly, the voltage stored at the first capacitor Cdc1 is made to induce a positive voltage +SUS to the secondary winding of the transformer 6T. The positive voltage +SUS induced to the secondary winding is rectified into a positive sustaining pulse Vcp by the first and second diodes 6D1 and 6D2 and applied to the panel capacitor Cp.

Subsequently, the first and second switches 6Q1 and 6Q2 are turned off, then the third switch 6Q3 is turned on by a switching control signal, then the fourth switch 6Q4 is turned on. With this, the voltage of the first capacitor Cdc1 flows the third switch 6Q3, the primary winding of the transformer 6T, the first inductor 6L1, the second capacitor 6C2, the fourth switch 6Q4. Accordingly, the voltage stored at the first capacitor Cdc1 is made to induce a negative voltage −SUS to the secondary winding of the transformer 6T. The negative voltage −SUS induced to the secondary winding is rectified into a positive sustaining pulse by the third and fourth diodes 6D3 and 6D4 and applied to the panel capacitor Cp.

Figure 8:
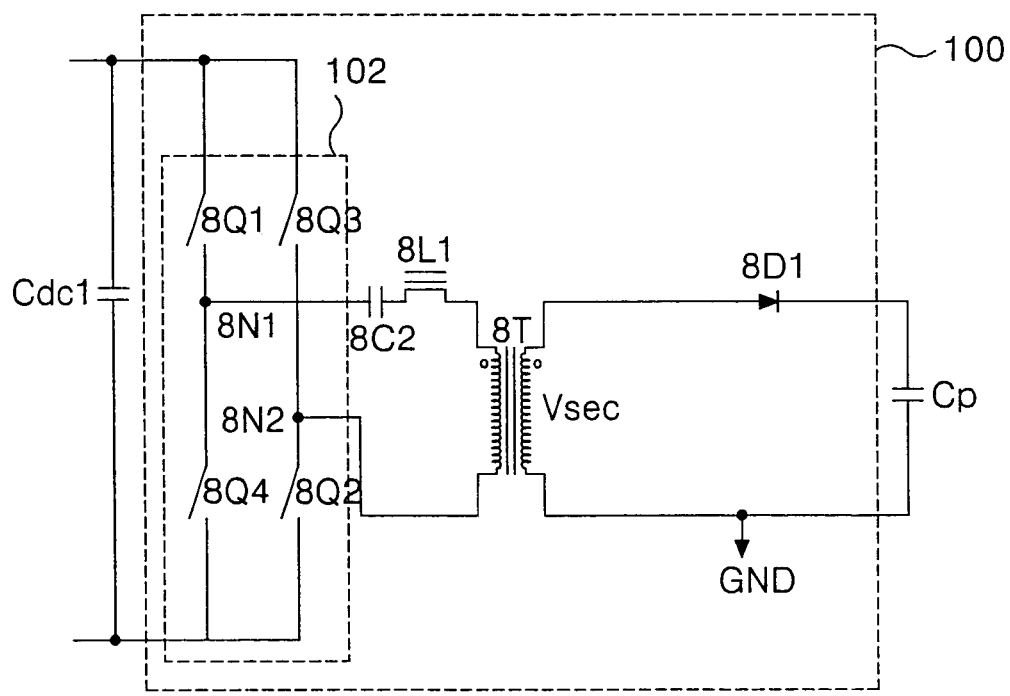
FIG. 8 illustrates a circuit diagram of a sustaining pulse generator of the PDP according to the second embodiment of the present invention.

Referring to FIG. 8, a sustaining pulse generator of a PDP according to the second embodiment of the present invention includes a first capacitor Cdc1 at which the voltage outputted from the PFC unit 50 is stored, and a DC/DC converter 60 converting the DC voltage applied from the first capacitor Cdc1 into square wave, transforming it, rectifying it and then applying it to a PDP panel 70.

The voltage applied from an AC input unit 51 has its harmonics eliminated by a PFC unit 50 and its power factor improved and is stored at the first capacitor Cdc1.

The DC/DC converter 100 includes a bridge switch 102 connected to both ends of the first capacitor Cdc1, a transformer 8T connected to the bridge switch 102 and converting the square wave applied by the switching of the bridge switch 102, a second capacitor 8C2 and a first inductor 8L1 connected in series between the transformer 8T and the bridge switch 102, and a diode 8D1 connected to a secondary winding of the transformer 8T.

The bridge switch 102 consists of a first to a fourth switches 8Q1, 8Q2, 8Q3 and 8Q4 arranged in a full bridge type at both ends of the first capacitor Cdc1.

The first and third switches 8Q1 and 8Q3 are connected in parallel with one end of the first capacitor Cdc1, and the second and fourth switches 8Q2 and 8Q4 are connected in parallel with the other end of the first capacitor Cdc1. Herein, the first to fourth switches 8Q1, 8Q2, 8Q3 and 8Q4 are Field Effect Transistors FET.

There are a first node 8N1 connected to the first and fourth switches 8Q1 and 8Q4, and a second node 8N2 connected to the second and third switches 8Q2 and 8Q3. The first node 8N1 is connected to the upper end of a primary winding of the transformer 8T through the second capacitor 8C2 and the first inductor 8L1, and the second node 8N2 is connected to the lower end of the primary winding of the transformer 8T. The bridge switch 102 converts the voltage applied from the first capacitor Cdc1 into square wave by alternate switching of the first to fourth switches 8Q1, 8Q2, 8Q3 and 8Q4 and applies it to the primary winding of the transformer 8T.

The second capacitor 8C2 is a DC blocking capacitor for preventing a current with a DC component applied to the transformer 8T via the bridge switch 102.

The first inductor 8L1 is a resonant coil for eliminating switching loss of the first to fourth switches 8Q1, 8Q2, 8Q3 and 8Q4 of the bridge switch 102.

The transformer 8T insulates the primary winding and the secondary winding and transforms the input voltage. In other words, the transformer 8T transforms the voltage applied to the primary winding and has the transformed voltage out to the secondary winding by a turn-ratio between the primary winding and the secondary winding. The one end of the primary winding of the transformer 8T is connected to the first inductor 8L1, the other end of the primary winding to the second node 8N2.

The diode 8D1 does half wave rectification to the AC pulses induced to the secondary winding of the transformer 8T into positive sustaining pulses and applies it to a panel capacitor Cp.

Figure 9:
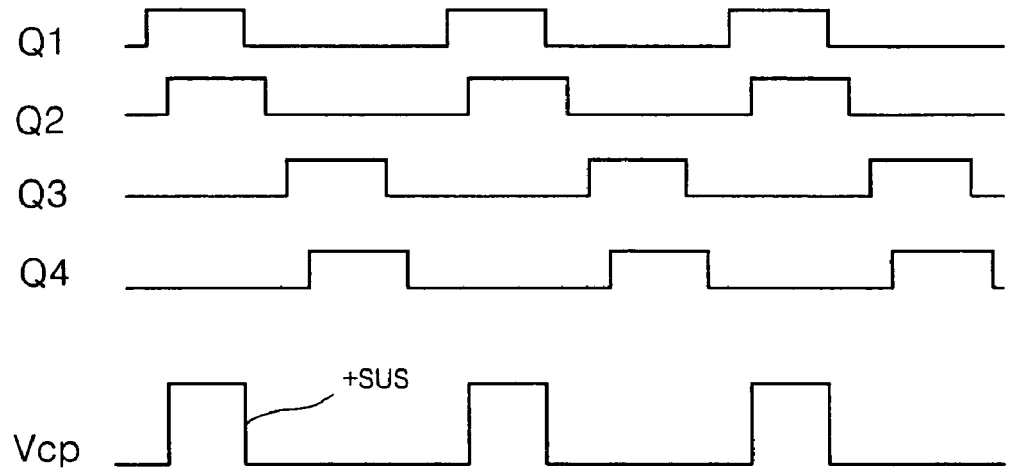
FIG. 9 illustrates a driving waveform diagram of the sustaining pulse generator of the PDP shown in FIG. 8.

The operation of the sustaining pulse generator of the PDP according to the second embodiment of the present invention is described as follows in conjunction with FIG. 9.

After the first switch 8Q1 is turned on by the switching control signal, the second switch 8Q2 is turned on so that the voltage of the first capacitor Cdc1 flows via the first switch 8Q1, the second capacitor 8C2, the first inductor 8L1, the primary winding of the transformer 8T and the second switch 8Q2. Accordingly, the voltage stored at the first capacitor Cdc1 is made to induce a positive voltage +SUS to the secondary winding of the transformer 8T. The positive voltage +SUS induced to the secondary winding is rectified into a positive sustaining pulse Vcp by the first 8D1 and applied to the panel capacitor Cp.

Subsequently, the first and second switches 8Q1 and 8Q2 are turned off, then the third switch 8Q3 is turned on by a switching control signal, then the fourth switch 8Q4 is turned on. With this, the voltage of the first capacitor Cdc1 flows the third switch 8Q3, the primary winding of the transformer 8T, the first inductor 8L1, the second capacitor 8C2, the fourth switch 8Q4. Accordingly, the voltage stored at the first capacitor Cdc1 is made to induce a negative voltage −SUS to the secondary winding of the transformer 8T, but is intercepted by the reverse-biased diode 8D1 not to be applied to the panel capacitor Cp.

Figure 10:
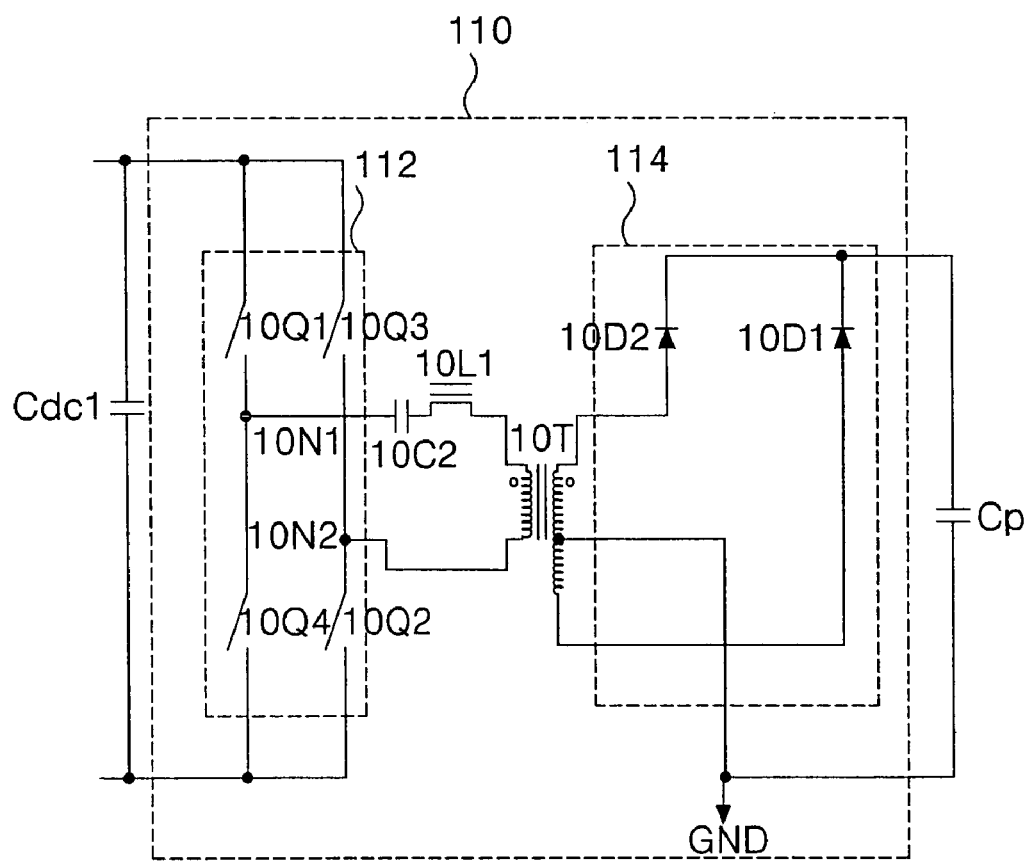
FIG. 10 illustrates a circuit diagram of a sustaining pulse generator of the PDP according to the third embodiment of the present invention.

Referring to FIG. 10, a sustaining pulse generator of a PDP according to the third embodiment of the present invention includes a first capacitor Cdc1 at which the voltage outputted from the PFC unit 50 is stored, and a DC/DC converter 110 converting the DC voltage applied from the first capacitor Cdc1 into square wave, transforming it, rectifying it and then applying it to a PDP panel Cp.

The voltage applied from an AC input unit 51 has its harmonics eliminated by a PFC unit 50 and its power factor improved and is stored at the first capacitor Cdc1.

The DC/DC converter 110 includes a bridge switch 112 connected to both ends of the first capacitor Cdc1, a center tap transformer 10T converting the square wave applied by the switching of the bridge switch 112, a second capacitor 10C2 and a first inductor 10L1 connected in series between the center tap transformer 10T and the bridge switch 112, and a full wave rectifier 114 connected to a secondary winding of the center tap transformer 10T and rectifying the voltage induced to the secondary winding of the center tap transformer 10T to apply to a panel capacitor Cp.

The bridge switch 112 consists of a first to a fourth switches 10Q1, 10Q2, 10Q3 and 10Q4 arranged in a full bridge type at both ends of the first capacitor Cdc1.

The first and third switches 10Q1 and 10Q3 are connected in parallel with one end of the first capacitor Cdc1, and the second and fourth switches 10Q2 and 10Q4 are connected in parallel with the other end of the first capacitor Cdc1. Herein, the first to fourth switches 10Q1, 10Q2, 10Q3 and 10Q4 are Field Effect Transistors FET.

There are a first node 10N1 connected to the first and fourth switches 10Q1 and 10Q4, and a second node 10N2 connected to the second and third switches 10Q2 and 10Q3. The first node 10N1 is connected to the upper end of a primary winding of the center tap transformer 10T through the second capacitor 10C2 and the first inductor 10L1, and the second node 10N2 is connected to the lower end of the primary winding of the center tap transformer 10T. Herein, the first and second switches 10Q1 and 10Q2 are switched at the same time, or the second switch 10Q2 is switched after the first switch 10Q1 is switched. The third and fourth switches 10Q3 and 10Q4 are switched at the same time, or the fourth switch 10Q4 is switched after the third switch 10Q3 is switched.

The bridge switch 112 converts the voltage applied from the first capacitor Cdc1 into square wave by alternate switching of the first to fourth switches 10Q1, 10Q2, 10Q3 and 10Q4 and applies it to the primary winding of the center tap transformer 10T.

The second capacitor 10C2 is a DC blocking capacitor for preventing a current with a DC component applied to the center tap transformer 10T via the bridge switch 112.

The first inductor 10L1 is a resonant coil for eliminating switching loss of the first to fourth switches 10Q1, 10Q2, 10Q3 and 10Q4 of the bridge switch 112.

The center tap transformer 10T insulates the primary winding and the secondary winding and transforms the input voltage. In other words, the center tap transformer 10T transforms the voltage applied to the primary winding and has the transformed voltage out to the secondary winding by a turn-ratio between the primary winding and the secondary winding. The center tap transformer 10T induces the voltage from the primary winding to the secondary winding by the turn-ratio between the primary winding and the secondary winding. The one end of the primary winding of the center tap transformer 10T is connected to the first inductor 10L1, the other end of the primary winding to the second node 10N2.

The full wave rectifier 114 includes a first diode 10D1 arranged between both ends of the secondary winding of the center tap transformer 10T and a second diode 10D2 arranged between the first diode 10D1 and a positive (+) terminal of the center tap transformer 10T in order to rectify the AC pulse induced to the secondary winding of the center tap transformer 10T.

The second diode 10D2 rectifies the positive (+) square waves induced between a positive (+) terminal of the secondary winding and a center tap into positive sustaining pulses and applies it to a panel capacitor Cp. The diode 10D1 rectifies the negative (−) square waves induced between the center tap and a negative (−) terminal of the secondary winding into positive sustaining pulses and applies it to a panel capacitor Cp.

Figure 11:
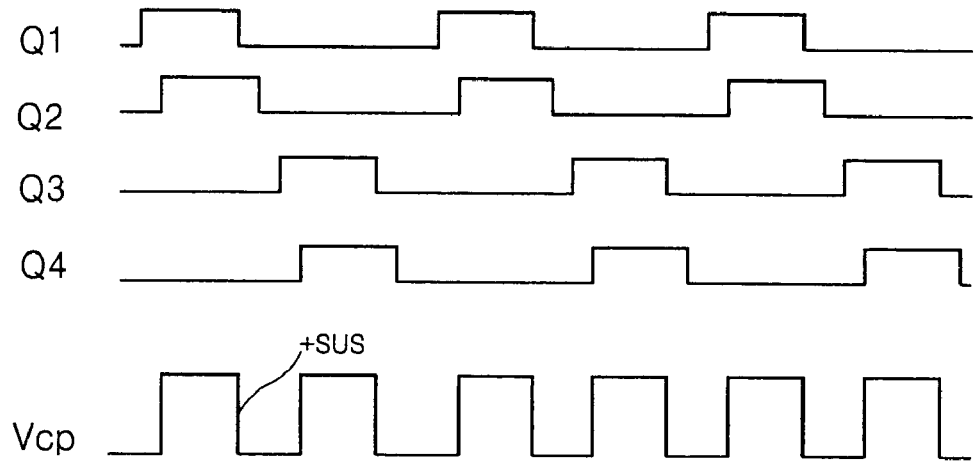
FIG. 11 illustrates a driving waveform diagram of the sustaining pulse generator of the PDP shown in FIG. 10.

The operation of the sustaining pulse generator of the PDP according to the third embodiment of the present invention is described as follows in conjunction with FIG. 11.

After the first switch 10Q1 is turned on by the switching control signal, the second switch 10Q2 is turned on so that the voltage of the first capacitor Cdc1 flows via the first switch 10Q1, the second capacitor 10C2, the first inductor 10L1, the primary winding of the center tap transformer 10T and the second switch 10Q2. Accordingly, the voltage stored at the first capacitor Cdc1 is made to induce a positive voltage +SUS to the secondary winding of the center tap transformer 10T. The positive voltage +SUS induced to the secondary winding is rectified into a positive sustaining pulse Vcp by the second 10D2 and applied to the panel capacitor Cp.

Subsequently, the first and second switches 10Q1 and 10Q2 are turned off, then the third switch 10Q3 is turned on by a switching control signal, then the fourth switch 10Q4 is turned on. With this, the voltage of the first capacitor Cdc1 flows the third switch 10Q3, the primary winding of the center tap transformer 10T, the first inductor 10L1, the second capacitor 10C2, the fourth switch 10Q4. Accordingly, the voltage stored at the first capacitor Cdc1 is made to induce a negative voltage −SUS to the secondary winding of the transformer 10T. The negative voltage −SUS induced to the secondary winding is rectified into the positive sustaining pulse by the first diode 10D1 to be applied to the panel capacitor Cp.

Figure 12:
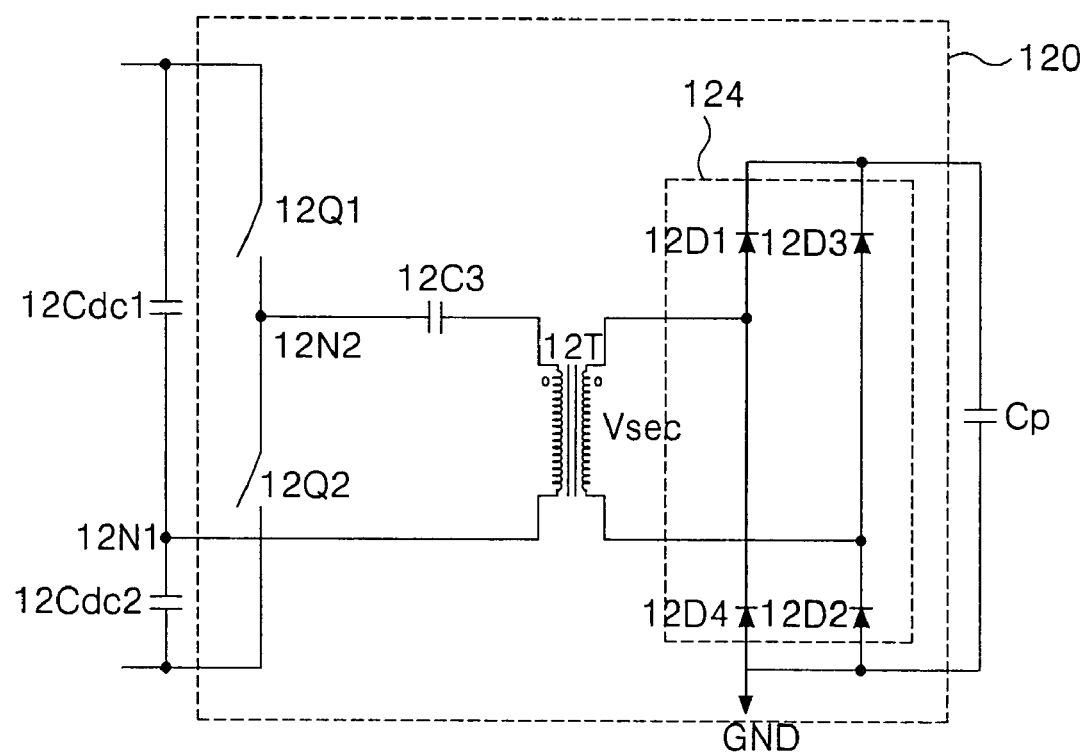
FIG. 12 illustrates a circuit diagram of a sustaining pulse generator of the PDP according to the fourth embodiment of the present invention.

Referring to FIG. 12, a sustaining pulse generator of a PDP according to the fourth embodiment of the present invention includes a first capacitor 12Cdc1 and a second capacitor 12Cdc2 connected in series and stored with the voltage outputted from the PFC unit 50, and a DC/DC converter 120 converting the DC voltage stored at the first and second capacitors 12Cdc1 and 12Cdc2 into square wave, transforming it, rectifying it and then applying it to a panel capacitor Cp.

The voltage applied from an AC input unit 51 has its harmonics eliminated by a PFC unit 50 and its power factor improved and is stored at the first and second capacitors 12Cdc1 and 12Cdc2.

The DC/DC converter 120 includes a first switch 12Q1 and a second switch 12Q2 connected to both ends of the first and second capacitors 12Cdc1 and 12Cdc2, a transformer 12T converting the square wave applied by the switching of the first switch 12Q1 and the second switch 12Q2, and a bridge rectifier 124 of full bridge type connected to a secondary winding of the transformer 12T.

The first switch 12Q1 is arranged between the first capacitor 12Cdc1 and the second node 12N2, the second switch 12Q2 is arranged between the second capacitor 12Cdc2 and the second node 12N2. Herein, the first and second switches 12Q1 and 12Q2 are Field Effect Transistors FET. The first and second switches 12Q1 and 12Q2 convert the voltage applied from the first and second capacitors 12Cdc1 and 12Cdc2 by the alternate switching into square wave to apply to the primary winding of the transformer 12T.

The transformer 12T insulates the primary winding and the secondary winding and transforms the input voltage. In other words, the transformer 12T transforms the voltage applied to the primary winding and has the transformed voltage out to the secondary winding by a turn-ratio between the primary winding and the secondary winding. The one end of the primary winding of the transformer 12T is connected to the second node 12N2, the other end of the primary winding to a first node 12N1 between the first and second capacitors 12Cdc1 and 12Cdc 2. Further, there is a DC blocking capacitor 12C3 additionally arranged between one end of the primary winding and the second node 12N2 for preventing the current of DC component applied to the transformer 12T by the switching of the first and second switches 12Q1 and 12Q2.

The bridge rectifier 124 includes a first diode to a fourth diode 12D1, 12D2, 12D3 and 12D4 connected in a full bridge type to both ends of the secondary winding of the transformer 12T in order to rectify the polarity of the AC pulse Vsec induced to the secondary winding of the transformer 12T.

The first and second diodes 12D1 and 12D2 rectifies the positive (+) AC pulses induced to the secondary winding of the transformer 12T into positive sustaining pulses. The third and fourth diodes 12D3 and 12D4 rectifies the negative (−) AC pulses induced to the secondary winding of the transformer 12T into positive sustaining pulses. The positive sustaining pulses rectified by the bridge rectifier 124 are applied to a panel capacitor Cp.

Figure 13:
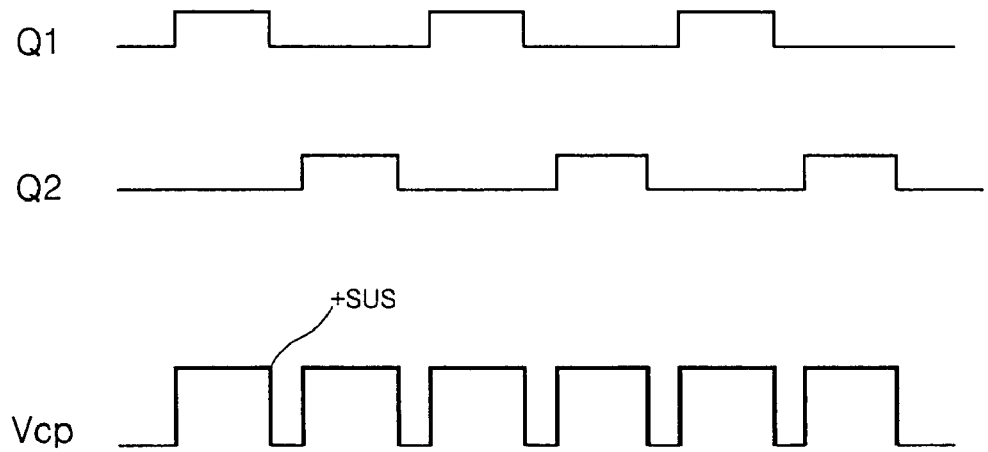
FIG. 13 illustrates a driving waveform diagram of the sustaining pulse generator of the PDP shown in FIG. 12.

The operation of the sustaining pulse generator of the PDP according to the fourth embodiment of the present invention is described as follows in conjunction with FIG. 13.

The first switch 12Q1 is turned on by a switching control signal so that the voltage of the first capacitor 12Cdc1 flows via the first switch 12Q1, the second node 12N2, the a third capacitor 12C3, the primary winding of the transformer T and the first node 12N2. Accordingly, the voltage stored at the first capacitor 12Cdc1 is made to induce a positive voltage +SUS to the secondary winding of the transformer 12T. The positive voltage +SUS induced to the secondary winding is rectified into a positive sustaining pulse Vcp by the first and second diodes 12D1 and 12D2 and applied to the panel capacitor Cp.

Subsequently, the first switches 12Q1 is turned off, then the second switch 12Q2 is turned on by a switching control signal so that the voltage of the second capacitor 12Cdc2 flows the first node 12N1, the primary winding of the transformer T, the third capacitor 12C3, the second node 12N2 and the second switch 12Q2. Accordingly, the voltage stored at the second capacitor 12Cdc2 is made to induce a negative voltage −SUS to the secondary winding of the transformer 12T. The negative voltage −SUS induced to the secondary winding is rectified into a positive sustaining pulse by the third and fourth diodes 12D3 and 12D4 and applied to the panel capacitor Cp.

Figure 14:
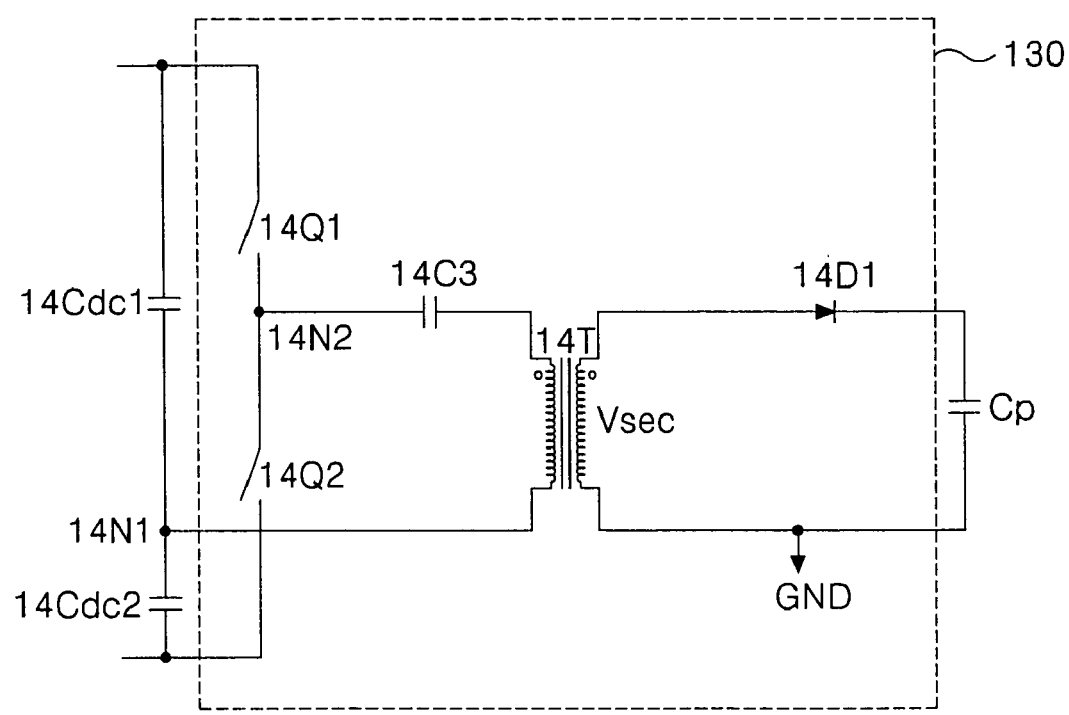
FIG. 14 illustrates a circuit diagram of a sustaining pulse generator of the PDP according to the fifth embodiment of the present invention.

Referring to FIG. 14, a sustaining pulse generator of a PDP according to the fifth embodiment of the present invention includes a first capacitor 14Cdc1 and a second capacitor 14Cdc2 connected in series and stored with the voltage outputted from the PFC unit 50, and a DC/DC converter 130 converting the DC voltage stored at the first and second capacitors 14Cdc1 and 14Cdc2 into square wave, transforming it, rectifying it and then applying it to a panel capacitor Cp.

The voltage applied from an AC input unit 51 has its harmonics eliminated by a PFC unit 50 and its power factor improved and is stored at the first and second capacitors 14Cdc1 and 14Cdc2.

The DC/DC converter 130 includes a first switch 14Q1 and a second switch 14Q2 connected to both ends of the first and second capacitors 14Cdc1 and 14Cdc2, a transformer 14T converting the square wave applied by the switching of the first switch 14Q1 and the second switch 14Q2, and a diode 14D1 connected to a secondary winding of the transformer 14T.

The first switch 14Q1 is arranged between the first capacitor 14Cdc1 and the second node 14N2, the second switch 14Q2 is arranged between the second capacitor 14Cdc2 and the second node 14N2. Herein, the first and second switches 14Q1 and 14Q2 are Field Effect Transistors FET. The first and second switches 14Q1 and 14Q2 convert the voltage applied from the first and second capacitors 14Cdc1 and 14Cdc2 by the alternate switching into square wave to apply to the primary winding of the transformer 14T.

The transformer 14T insulates the primary winding and the secondary winding and transforms the input voltage. In other words, the transformer 14T transforms the voltage applied to the primary winding and has the transformed voltage out to the secondary winding by a turn-ratio between the primary winding and the secondary winding. The one end of the primary winding of the transformer 14T is connected to the second node 14N2, the other end of the primary winding to a first node 14N1 between the first and second capacitors 14Cdc1 and 14Cdc 2. Further, there is a DC blocking capacitor 14C3 additionally arranged between one end of the primary winding and the second node 14N2 for preventing the current of DC component applied to the transformer 14T by the switching of the first and second switches 14Q1 and 14Q2.

The diode 14D1 does half wave rectification to the AC pulses induced to the secondary winding of the transformer 8T into positive sustaining pulses and applies it to a panel capacitor Cp.

Figure 15:
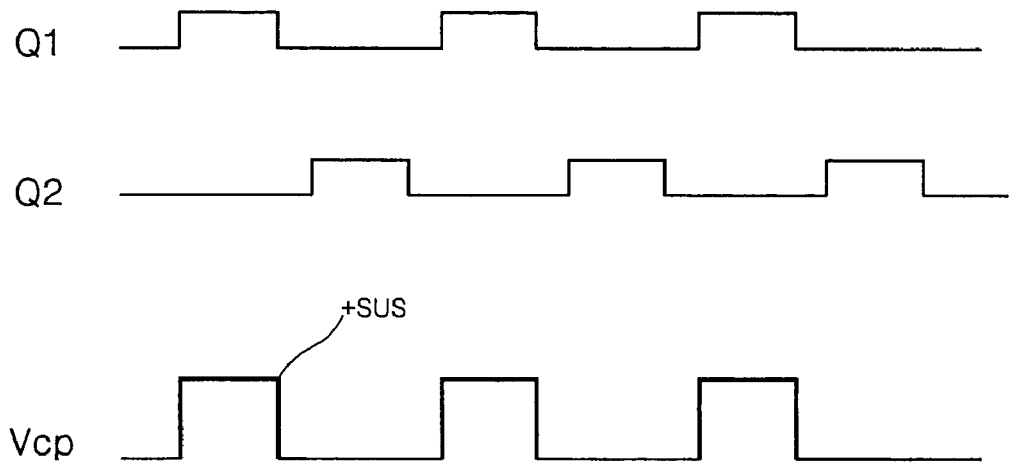
FIG. 15 illustrates a driving waveform diagram of the sustaining pulse generator of the PDP shown in FIG. 14.

The operation of the sustaining pulse generator of the PDP according to the fifth embodiment of the present invention is described as follows in conjunction with FIG. 15.

The first switch 14Q1 is turned on by a switching control signal so that the voltage of the first capacitor 14Cdc1 flows via the first switch 14Q1, the second node 14N2, the a third capacitor 14C3, the primary winding of the transformer 14T and the first node 14N1. Accordingly, the voltage stored at the first capacitor 14Cdc1 is made to induce a positive voltage +SUS to the secondary winding of the transformer 14T. The positive voltage +SUS induced to the secondary winding is rectified into a positive sustaining pulse Vcp by the diode 14D1 and applied to the panel capacitor Cp.

Subsequently, the first switches 14Q1 is turned off, then the second switch 14Q2 is turned on by a switching control signal so that the voltage of the second capacitor 14Cdc2 flows the first node 14N1, the primary winding of the transformer 14T, the third capacitor 14C3, the second node 14N2 and the second switch 14Q2. Accordingly, the voltage stored at the first capacitor 14Cdc1 is made to induce a negative voltage −SUS to the secondary winding of the transformer 14T, but is intercepted by a reverse-biased diode 14D1 not to be applied to the panel capacitor Cp.

Figure 16:
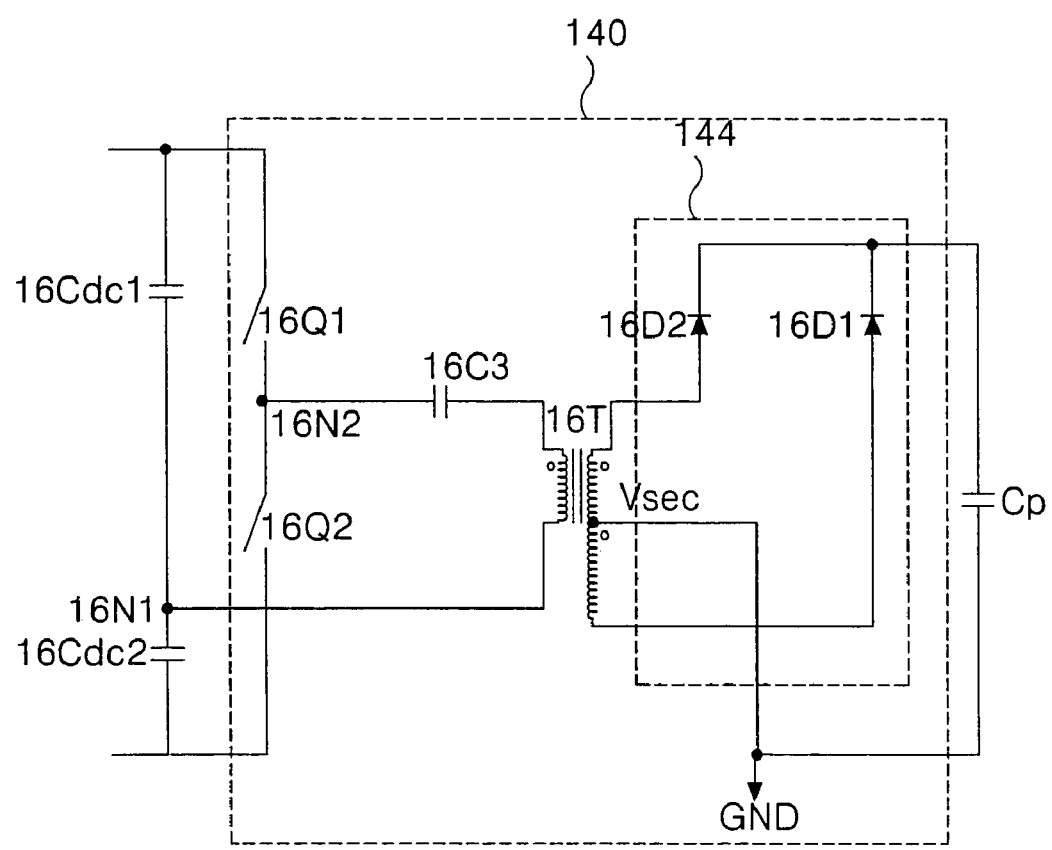
FIG. 16 illustrates a circuit diagram of a sustaining pulse generator of the PDP according to the sixth embodiment of the present invention.

Referring to FIG. 16, a sustaining pulse generator of a PDP according to the sixth embodiment of the present invention includes a first capacitor 16Cdc1 and a second capacitor 16Cdc2 connected in series and stored with the voltage outputted from the PFC unit 50, and a DC/DC converter 140 converting the DC voltage stored at the first and second capacitors 16Cdc1 and 16Cdc2 into square wave, transforming it, rectifying it and then applying it to a panel capacitor Cp.

The voltage applied from an AC input unit 51 has its harmonics eliminated by a PFC unit 50 and its power factor improved and is stored at the first and second capacitors 16Cdc1 and 16Cdc2.

The DC/DC converter 140 includes a first switch 16Q1 and a second switch 16Q2 connected to both ends of the first and second capacitors 16Cdc1 and 16Cdc2, a center tap transformer 16T converting the square wave applied by the switching of the first switch 16Q1 and the second switch 16Q2, a full wave rectifier 144 connected to a secondary winding of the center tap transformer 16T and rectifying the voltage induced to the secondary winding of the center tap transformer 16T to apply to the panel capacitor Cp.

The first switch 16Q1 is arranged between the first capacitor 16Cdc1 and the second node 16N2, the second switch 16Q2 is arranged between the second capacitor 16Cdc2 and the second node 16N2. Herein, the first and second switches 16Q1 and 16Q2 are Field Effect Transistors FET. The first and second switches 16Q1 and 16Q2 convert the voltage applied from the first and second capacitors 16Cdc1 and 16Cdc2 by the alternate switching into square wave to apply to the primary winding of the center tap transformer 16T.

The center tap transformer 16T insulates the primary winding and the secondary winding and transforms the input voltage. In other words, the center tap transformer 16T transforms the voltage applied to the primary winding and has the transformed voltage out to the secondary winding by a turn-ratio between the primary winding and the secondary winding. The one end of the primary winding of the center tap transformer 16T is connected to the second node 16N2, the other end of the primary winding to a first node 16N1 between the first and second capacitors 16Cdc1 and 16Cdc 2. Further, there is a DC blocking capacitor 16C3 additionally arranged between one end of the primary winding and the second node 16N2 for preventing the current of DC component applied to the center tap transformer 16T by the switching of the first and second switches 16Q1 and 16Q2.

The bridge rectifier 144 includes a first diode 16D1 arranged between both ends of the secondary winding of the center tap transformer 16T, and a second diode 16D2 arranged between the first diode 16D1 and a positive (+) terminal of the center tap transformer 16T in order to rectify the AC pulse induced to the secondary winding of the center tap transformer 16T.

The second diode 16D2 rectifies the positive (+) square wave induced between a positive (+) terminal and a center tap of the secondary winding into positive sustaining pulses and applies it to the panel capacitor Cp. The first diode 16D1 rectifies the negative (−) square wave induced between a positive (−) terminal and the center tap of the secondary winding into positive sustaining pulses and applies it to the panel capacitor Cp.

Figure 17:
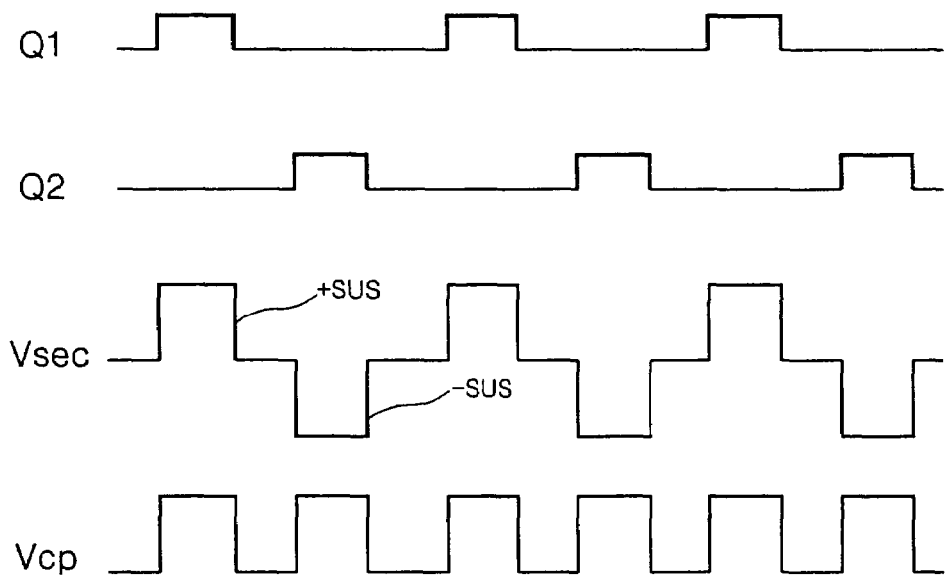
FIG. 17 illustrates a driving waveform diagram of the sustaining pulse generator of the PDP shown in FIG. 16.

The operation of the sustaining pulse generator of the PDP according to the sixth embodiment of the present invention is described as follows in conjunction with FIG. 17.

The first switch 16Q1 is turned on by a switching control signal so that the voltage of the first capacitor 16Cdc1 flows via the first switch 16Q1, the second node 16N2, the a third capacitor 16C3, the primary winding of the center tap transformer 16T and the first node 16N1. Accordingly, the voltage stored at the first capacitor 16Cdc1 is made to induce a positive voltage +SUS to the secondary winding of the center tap transformer 16T. The positive voltage +SUS induced to the secondary winding is rectified into a positive sustaining pulse Vcp by the second diode 16D2 and applied to the panel capacitor Cp.

Subsequently, the first switches 16Q1 is turned off, then the second switch 16Q2 is turned on by a switching control signal so that the voltage of the second capacitor 16Cdc2 flows the first node 16N1, the primary winding of the center tap transformer 16T, the third capacitor 16C3, the second node 16N2 and the second switch 16Q2. Accordingly, the voltage stored at the second capacitor 16Cdc2 is made to induce a negative voltage −SUS to the secondary winding of the center tap transformer 16T. The negative voltage −SUS induced to the secondary winding is rectified into the positive sustaining pulse Vcp by the first diode 16D1 to be applied to the panel capacitor Cp.

Figure 18:
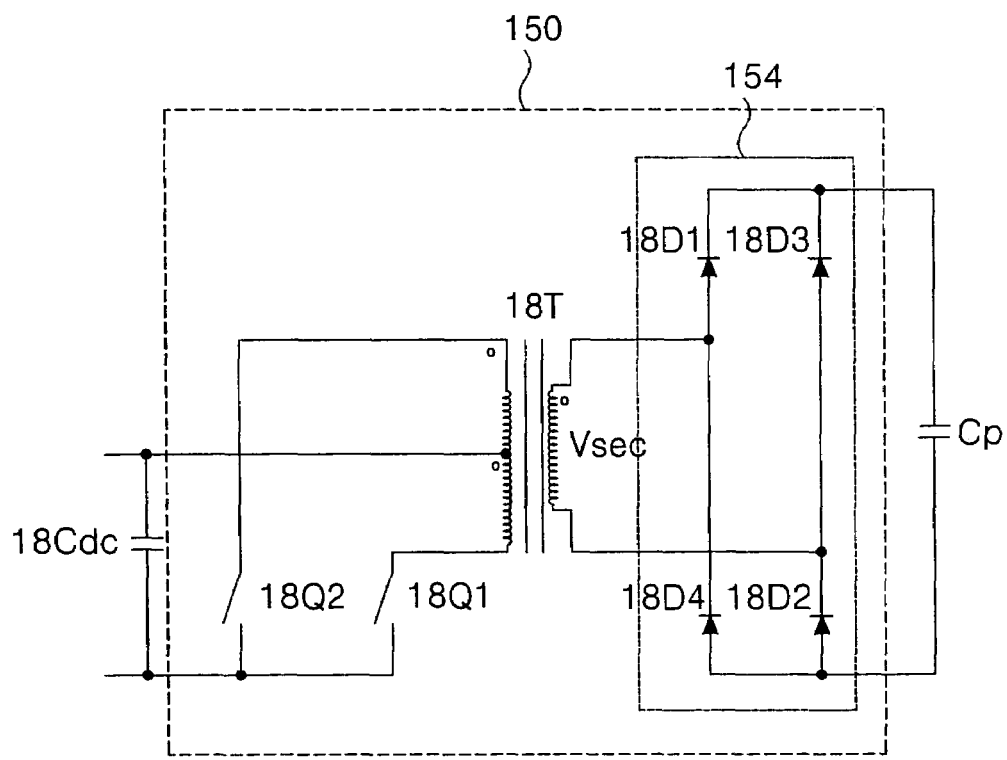
FIG. 18 illustrates a circuit diagram of a sustaining pulse generator of the PDP according to the seventh embodiment of the present invention.

Referring to FIG. 18, a sustaining pulse generator of a PDP according to the seventh embodiment of the present invention includes a capacitor 18Cdc stored with the voltage outputted from the PFC unit 50, and a DC/DC converter 150 converting the DC voltage applied from the capacitor 18Cdc into square wave, transforming it, rectifying it and then applying it to a PDP panel Cp.

The voltage applied from an AC input unit 51 has its harmonics eliminated by a PFC unit 50 and its power factor improved and is stored at the capacitor 18Cdc.

The DC/DC converter 150 includes a first switch 18Q1 and a second switch 18Q2 connected to one end of the capacitor 18Cdc; a center tap transformer 18T disposed between the first and second switches 18Q1 and 18Q2, having a center tap connected the other end of the capacitor 18Cdc and transforming the voltage applied by the switching of the first switch 18Q1 and the second switch 18Q2; a bridge rectifier 154 connected to a secondary winding of the center tap transformer 18T and rectifying the voltage induced to the secondary winding of the center tap transformer 18T to apply to the panel capacitor Cp.

The first switch 18Q1 is connected between one end of the first capacitor 18Cdc and a lower end of the primary winding of the center tap transformer 18T, the second switch 18Q2 is connected between the one end of the first capacitor 18Cdc and an upper end of the primary winding of the center tap transformer 18T. Herein, the first and second switches 18Q1 and 18Q2 are Field Effect Transistors FET. The first and second switches 18Q1 and 18Q2 convert the voltage applied from the capacitor 18Cdc by the alternate switching into square wave to apply to the primary winding of the center tap transformer 18T.

The center tap transformer 18T insulates the primary winding and the secondary winding and transforms the input voltage In other words, the center tap transformer 18T transforms the voltage applied to the primary winding and has the transformed voltage out to the secondary winding by a turn-ratio between the primary winding and the secondary winding. The one end of the primary winding of the center tap transformer 18T is connected to the first switch 18Q1, the other end of the primary winding to the second switch 18Q2, and the center tap to the capacitor 18Cdc.

The bridge rectifier 154 includes a first diode to a fourth diode 18D1, 18D2, 18D3 and 18D4 connected in a full bridge type to both ends of the secondary winding of the center tap transformer 18T in order to rectify the polarity of the AC pulse Vsec induced to the secondary winding of the center tap transformer 18T.

The first and second diodes 18D1 and 18D2 rectify the positive (+) AC pulse induced to the secondary winding of the center tap transformer 18T into positive sustaining pulses. The third and fourth diodes 18D3 and 18D4 rectify the negative (−) AC pulse induced to the secondary winding of the center tap transformer 18T into positive sustaining pulses. The rectified positive sustaining pulse by the bridge rectifier 154 in this way is applied to the panel capacitor Cp.

The operation of the sustaining pulse generator of the PDP according to the seventh embodiment of the present invention is described as follows in conjunction with FIG. 17.

The first switch 18Q1 is turned on by a switching control signal so that the voltage of the capacitor 18Cdc flows via the center tap of the center tap transformer 18T and the first switch 18Q1. Accordingly, the voltage stored at the capacitor 18Cdc is made to induce a positive voltage +SUS to the secondary winding of the center tap transformer 18T. The positive voltage +SUS induced to the secondary winding is rectified into a positive sustaining pulse Vcp by the first and second diodes 18D1 and 18D2 and applied to the panel capacitor Cp.

Subsequently, the first switches 18Q1 is turned off, then the second switch 18Q2 is turned on by a switching control signal so that the voltage of the second capacitor 18Cdc2 flows the center tap of the center tap transformer 18T and the second switch 18Q2. Accordingly, the voltage stored at the capacitor 18Cdc is made to induce a negative voltage −SUS to the secondary winding of the center tap transformer 18T. The negative voltage −SUS induced to the secondary winding is rectified into the positive sustaining pulse Vcp by the third and fourth diodes 18D3 and 18D4 to be applied to the panel capacitor Cp.

Figure 19:
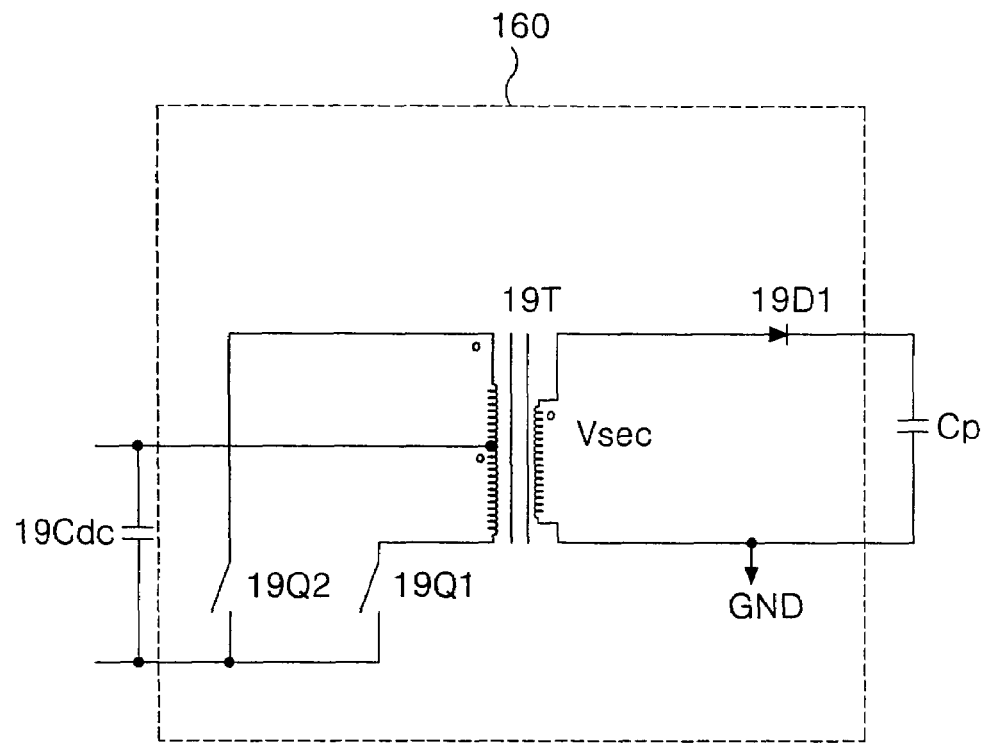
FIG. 19 illustrates a circuit diagram of a sustaining pulse generator of the PDP according to the eighth embodiment of the present invention.

Referring to FIG. 19, a sustaining pulse generator of a PDP according to the eighth embodiment of the present invention includes a capacitor 19Cdc stored with the voltage outputted from the PFC unit 50, and a DC/DC converter 160 converting the DC voltage applied from the capacitor 19Cdc into square wave, transforming it, rectifying it and then applying it to a PDP panel Cp.

The voltage applied from an AC input unit 51 has its harmonics eliminated by a PFC unit 50 and its power factor improved and is stored at the capacitor 19Cdc.

The DC/DC converter 160 includes a first switch 19Q1 and a second switch 19Q2 connected to one end of the capacitor 19Cdc; a center tap transformer 19T disposed between the first and second switches 19Q1 and 19Q2, having a center tap connected the other end of the capacitor 19Cdc and transforming the voltage applied by the switching of the first switch 19Q1 and the second switch 19Q2; a diode 19D1 connected to a secondary winding of the center tap transformer 19T and rectifying the voltage induced to the secondary winding of the center tap transformer 19T to apply to the panel capacitor Cp.

The first switch 19Q1 is connected between one end of the first capacitor 19Cdc and a lower end of the primary winding of the center tap transformer 19T, the second switch 19Q2 is connected between the one end of the first capacitor 19Cdc and an upper end of the primary winding of the center tap transformer 19T. Herein, the first and second switches 19Q1 and 19Q2 are Field Effect Transistors FET. The first and second switches 19Q1 and 19Q2 convert the voltage applied from the capacitor 19Cdc by the alternate switching into square wave to apply to the primary winding of the center tap transformer 19T.

The center tap transformer 19T insulates the primary winding and the secondary winding and transforms the input voltage. In other words, the center tap transformer 19T transforms the voltage applied to the primary winding and has the transformed voltage out to the secondary winding by a turn-ratio between the primary winding and the secondary winding. The one end of the primary winding of the center tap transformer 19T is connected to the first switch 19Q1, the other end of the primary winding to the second switch 19Q2, and the center tap to the capacitor 19Cdc.

The diode 19D1 does half wave rectification to the AC pulses Vsec induced to the secondary winding of the transformer 19T into positive sustaining pulses and applies it to a panel capacitor Cp.

Figure 20:
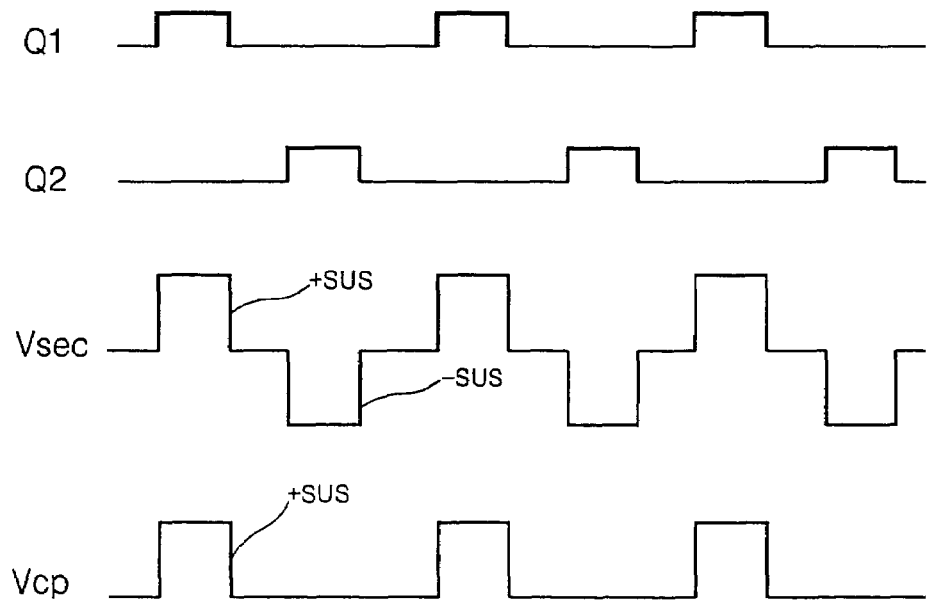
FIG. 20 illustrates a driving waveform diagram of the sustaining pulse generator of the PDP shown in FIG. 19.

The operation of the sustaining pulse generator of the PDP according to the eighth embodiment of the present invention is described as follows in conjunction with FIG. 20.

The first switch 19Q1 is turned on by a switching control signal so that the voltage of the capacitor 19Cdc flows via the center tap of the center tap transformer 19T and the first switch 19Q1. Accordingly, the voltage stored at the capacitor 19Cdc is made to induce a positive voltage +SUS to the secondary winding of the center tap transformer 19T. The positive voltage +SUS induced to the secondary winding is rectified into a positive sustaining pulse Vcp by the diode 19D1 and applied to the panel capacitor Cp.

Subsequently, the first switches 19Q1 is turned off, then the second switch 19Q2 is turned on by a switching control signal so that the voltage of the capacitor 19Cdc flows the center tap of the center tap transformer 19T and the second switch 19Q2. Accordingly, the voltage stored at the capacitor 19Cdc is made to induce a negative voltage −SUS to the secondary winding of the center tap transformer 19T, but is intercepted by the reverse-biased diode 19D1 not to be applied to the panel capacitor Cp.

Figure 21:
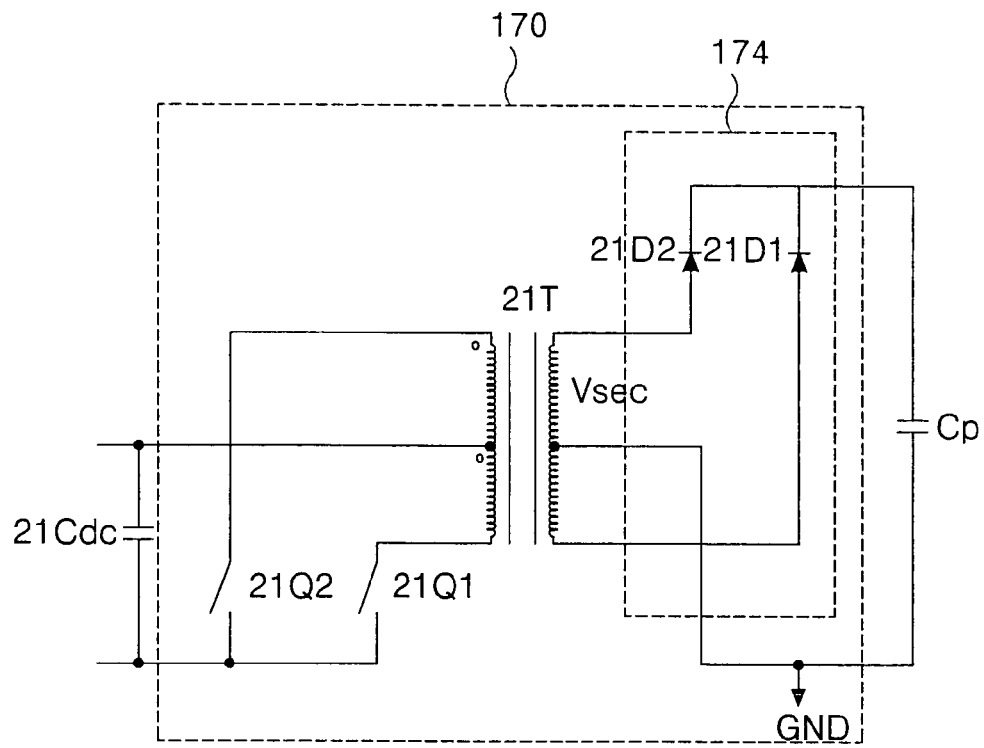
FIG. 21 illustrates a circuit diagram of a sustaining pulse generator of the PDP according to the ninth embodiment of the present invention.

Referring to FIG. 21, a sustaining pulse generator of a PDP according to the ninth embodiment of the present invention includes a capacitor 21Cdc stored with the voltage outputted from the PFC unit 50, and a DC/DC converter 170 converting the DC voltage applied from the capacitor 21Cdc into square wave, transforming it, rectifying it and then applying it to a PDP panel Cp.

The voltage applied from an AC input unit 51 has its harmonics eliminated by a PFC unit 50 and its power factor improved and is stored at the capacitor 21Cdc.

The DC/DC converter 170 includes a first switch 21Q1 and a second switch 21Q2 connected to one end of-the capacitor 21Cdc; a center tap transformer 21T disposed between the first and second switches 21Q1 and 21Q2, having a center tap connected the other end of the capacitor 21Cdc and transforming the voltage applied by the switching of the first switch 21Q1 and the second switch 21Q2; a full wave rectifier 174 connected to a secondary winding of the center tap transformer 21T and rectifying the voltage induced to the secondary winding of the center tap transformer 21T to apply to the panel capacitor Cp.

The first switch 21Q1 is connected between one end of the first capacitor 21Cdc and a lower end of the primary winding of the center tap transformer 21T, the second switch 21Q2 is connected between the one end of the first capacitor 21Cdc and an upper end of the primary winding of the center tap transformer 21T. Herein, the first and second switches 21Q1 and 21Q2 are Field Effect Transistors FET. The first and second switches 21Q1 and 21Q2 convert the voltage applied from the capacitor 21Cdc by the alternate switching into square wave to apply to the primary winding of the center tap transformer 21T.

The center tap transformer 21T insulates the primary winding and the secondary winding and transforms the input voltage. In other words, the center tap transformer 21T transforms the voltage applied to the primary winding and has the transformed voltage out to the secondary winding by a turn-ratio between the primary winding and the secondary winding. The one end of the primary winding of the center tap transformer 21T is connected to the first switch 21Q1, the other end of the primary winding to the second switch 21Q2, and the center tap to the capacitor 21Cdc.

The full wave rectifier 174 includes a first diode 21D1 arranged between both ends of the secondary winding of the center tap transformer 21T and a second diode 21D2 arranged between the first diode 21D1 and a positive (+) terminal of the center tap transformer 21T in order to rectify the AC pulse induced to the secondary winding of the center tap transformer 21T.

The second diode 21D2 rectifies the positive (+) square waves induced between a positive (+) terminal and the center tap of the secondary winding into positive sustaining pulses and applies it to a panel capacitor Cp. The diode 21D1 rectifies the negative (−) square waves induced between the center tap and a negative (−) terminal of the secondary winding into positive sustaining pulses and applies it to a panel capacitor Cp.

The operation of the sustaining pulse generator of the PDP according to the ninth embodiment of the present invention is described as follows in conjunction with FIG. 17.

The first switch 21Q1 is turned on by a switching control signal so that the voltage of the capacitor 21Cdc flows via the center tap of the center tap transformer 21T and the first switch 21Q1. Accordingly, the voltage stored at the capacitor 21Cdc is made to induce a positive voltage +SUS to the secondary winding of the center tap transformer 21T. The positive voltage +SUS induced to the secondary winding is rectified into a positive sustaining pulse Vcp by the first diode 21D1 and applied to the panel capacitor Cp.

Subsequently, the first switches 21Q1 is turned off, then the second switch 21Q2 is turned on by a switching control signal so that the voltage of the capacitor 21Cdc flows the center tap of the center tap transformer 21T and the second switch 21Q2. Accordingly, the voltage stored at the capacitor 21Cdc is made to induce a negative voltage −SUS to the secondary winding of the center tap transformer 21T. The negative voltage −SUS induced to the secondary winding is rectified into a positive sustaining pulse Vcp by the second diode 21D2 and applied to the panel capacitor Cp.

Figure 22:
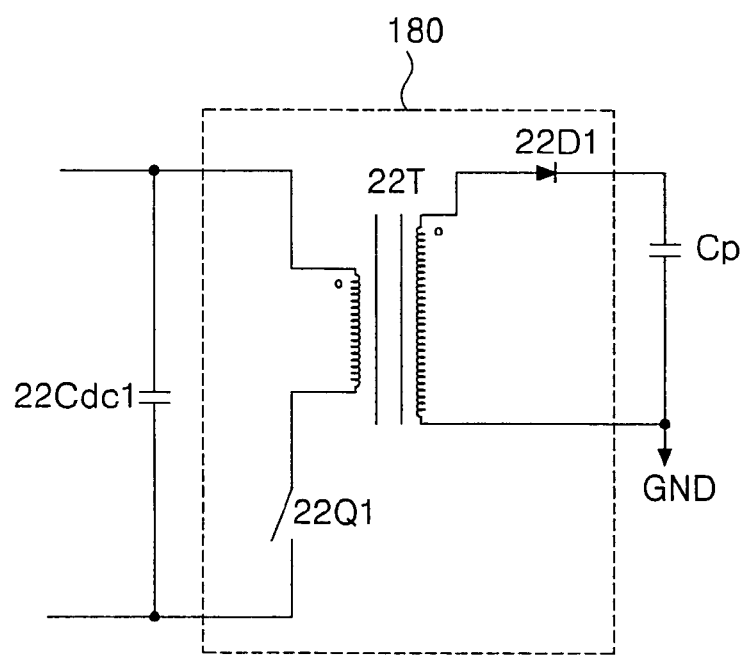
FIG. 22 illustrates a circuit diagram of a sustaining pulse generator of the PDP according to the tenth embodiment of the present invention.

Referring to FIG. 22, a sustaining pulse generator of a PDP according to the tenth embodiment of the present invention includes a capacitor 22Cdc1 stored with the voltage outputted from the PFC unit 50, and a DC/DC converter 180 converting the DC voltage applied from the capacitor 22Cdc1 into square wave, transforming it, rectifying it and then applying it to a PDP panel Cp.

The voltage applied from an AC input unit 51 has its harmonics eliminated by a PFC unit 50 and its power factor improved and is stored at the capacitor 22Cdc1.

The DC/DC converter 180 includes a transformer 22T connected to both ends of the capacitor 22Cdc1, a switch 22Q1 disposed between the transformer 22T and the capacitor 22Cdc1 and applying square wave to the transformer 22T; a diode 22D1 connected to a secondary winding of the transformer 22T and rectifying the voltage induced to the secondary winding of the transformer 22T to apply to the panel capacitor Cp.

The switch 22Q1 is connected between one end of the capacitor 22Cdc1 and a lower end of the primary winding of the transformer 22T. Herein, the switch 22Q1 is Field Effect Transistors FET. The switch 22Q1 convert the voltage applied from the capacitor 22Cdc1 by switching into square wave to apply to the primary winding of the transformer 22T.

The transformer 22T insulates the primary winding and the secondary winding and transforms the input voltage. In other words, the transformer 22T transforms the voltage applied to the primary winding and has the transformed voltage out to the secondary winding by a turn-ratio between the primary winding and the secondary winding. The transformer 22T induces the voltage from the primary winding to the secondary winding by the turn-ratio between the primary winding and the secondary winding. The one end of the primary winding of the transformer 22T is connected to the switch 22Q1, the other end of the primary winding to the capacitor 22Cdc1.

The diode 22D1 does half wave rectification to the AC pulses induced to the secondary winding of the transformer 22T into positive sustaining pulses and applies it to a panel capacitor Cp.

Figure 23:
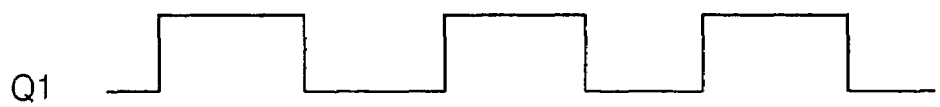
FIG. 23 illustrates a driving waveform diagram of the sustaining pulse generator of the PDP shown in FIG. 22.
Figure 23:
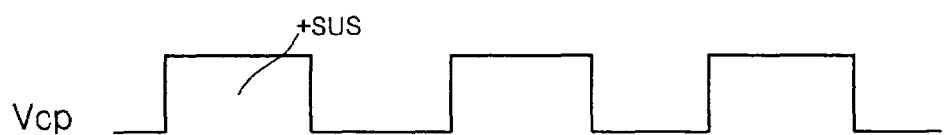

The operation of the sustaining pulse generator of the PDP according to the tenth embodiment of the present invention is described as follows in conjunction with FIG. 23.

The switch 22Q1 is turned on by a switching control signal so that the voltage of the capacitor 22Cdc1 flows via the primary winding of the transformer 22T and the switch 22Q1. Accordingly, the voltage stored at the capacitor 22Cdc1 is made to induce a positive voltage +SUS to the secondary winding of the transformer 22T. The positive voltage +SUS induced to the secondary winding is rectified into a positive sustaining pulse Vcp by the diode 22D1 and applied to the panel capacitor Cp.

Subsequently, the switches 22Q1 is turned off, then a switching control signal is not applied for one period. If the switch 22Q1 is turned on by the switching control signal After one period, the described process is repeated.

As a result, the voltage applied from the capacitor 22Cdc1 by the switching of the switch 22Q1 and induced to the secondary winding of the transformer 22T is half-wave-rectified to be applied to the panel capacitor Cp.

Figure 24:
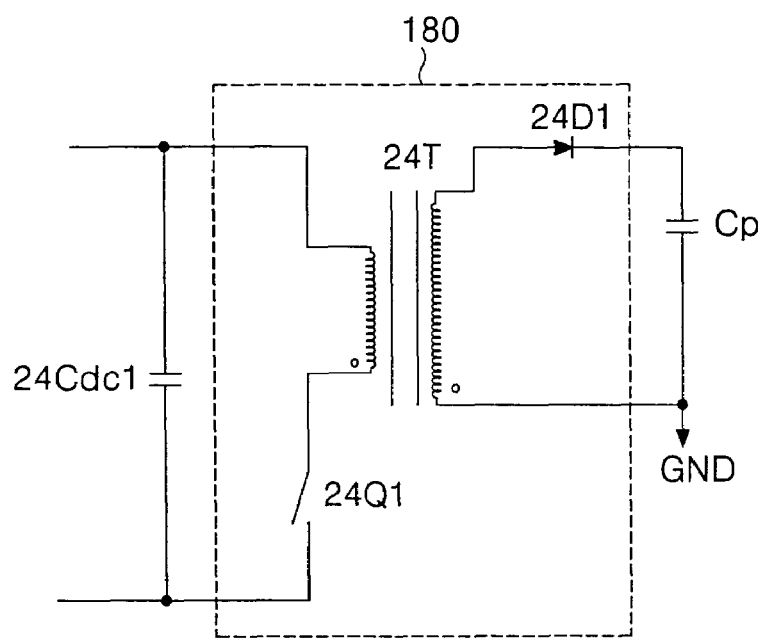
FIG. 24 illustrates a circuit diagram of another type of sustaining pulse generator of the PDP according to the tenth embodiment of the present invention.
Figure 25:
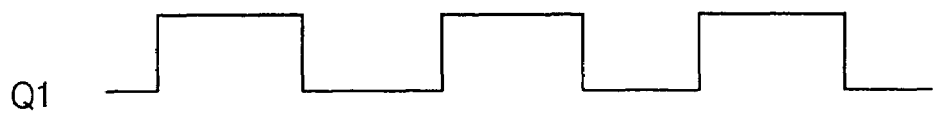
FIG. 25 illustrates a driving waveform diagram of the sustaining pulse generator of the PDP shown in FIG. 24.
Figure 25:
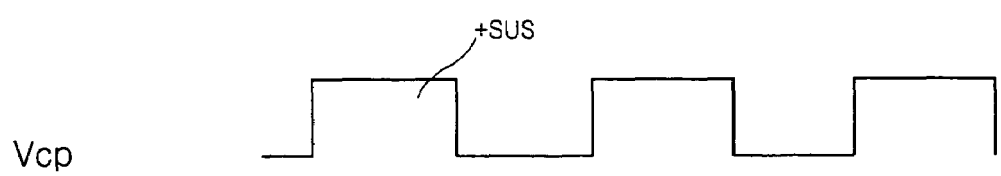

On the other hand, referring to FIG. 24, a secondary winding of the transformer 24T is wound having its positive (+) terminal and negative (+) terminal changed over. Accordingly, if a switch 24Q1 is turned off after being turned on by a switching control signal, the voltage induced to a secondary winding of the transformer 24T, as in FIG. 25, flows in a reverse direction and is rectified into a positive sustaining pulse Vcp by a diode 24D1 to be applied to a panel capacitor Cp.

Subsequently, the voltage induced to the secondary winding of the transformer 24T is blocked by the diode 24D1 so as not to be applied to the panel capacitor Cp because the induced voltage flows in a forward direction when the switch 24Q1 is turned on again.

Figure 26:
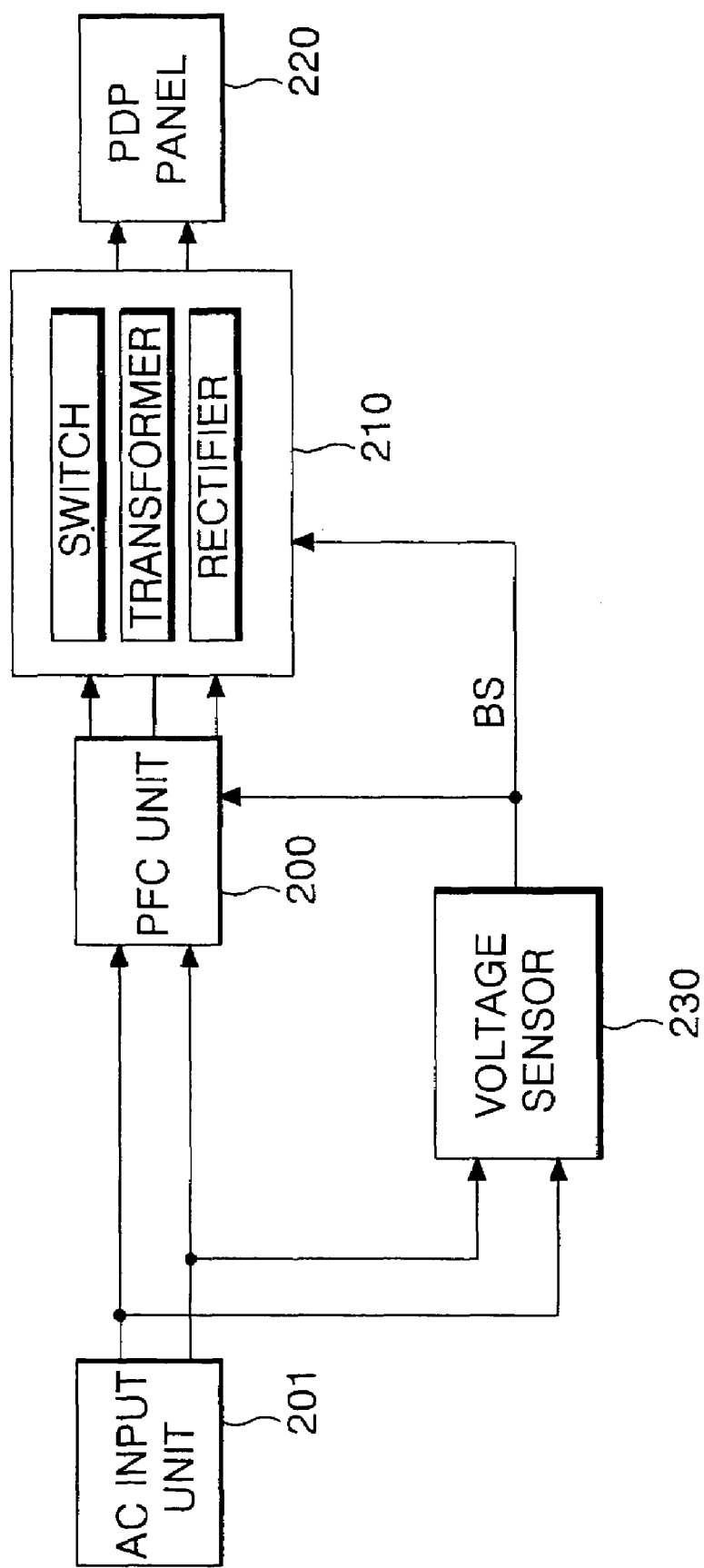
FIG. 26 illustrates a block diagram of a sustaining pulse generator of the PDP according to the eleventh embodiment of the present invention.

Referring to FIG. 26, a sustaining pulse generator according to the eleventh embodiment of the present invention includes an AC input unit 201 applying AC voltage; a power factor correction PFC unit 200 improving power factor of the voltage applied from the AC input unit 201 and eliminating harmonics; a DC/DC converter 210 converting the DC voltage generated at the PFC unit 200 into square wave, transforming it, rectifying it, and then applying it to a PDP panel 220; and a voltage sensor disposed between the AC input unit 201 and the PFC unit 200, sensing the level of the voltage inputted from the AC input unit 201 to the PFC unit 200 to vary the output voltage of the PFC unit 200 and sustain the output voltage of the DC/DC converter 210.

The PFC unit 200 controls input current from the AC input unit 201 to generate sine waves with the same phases, improve power factor and at the same time eliminate harmonics noise.

To this end, the PFC unit 200, as in FIG. 6A, includes a rectifying circuit 12 rectifying the AC inputted from the AC input unit 201 to DC, and a power factor correction circuit 14 improving the power factor of the DC rectified at the rectifying circuit 12.

The rectifying circuit 12 includes a first diode DF1 and a second diode DF2 arranged in a full bridge type and being forward biased during a positive (+) half period of the inputted AC, and a third diode DF3 and a fourth diode DF4 being forward biased during a negative (−) half period. The rectifying circuit 12 does full wave rectification to the AC inputted from the AC input unit 201 and stores the produced DC at a smoothing capacitor 2C.

The power factor correction circuit 14 includes a coil 2L being charged with a current component of the DC stored at the smoothing capacitor 2C of the rectifying circuit 12, a first transistor 2T1 installed between the coil 2L and the rectifying circuit 12 and switching for the current component of the DC to be stored at the coil 2L, and a first capacitor Cdc1 being charged with a voltage component of the DC applied from the smoothing capacitor 2C by switching of the first transistor 2T1.

When a control signal (not shown) turns on the first transistor 2T1, there is a loop formed between the smoothing capacitor 2C, the first transistor 2T1 and the coil 2L and the current component of the DC is stored at the coil 2L. Further, when the control signal (not shown) turns off the first transistor 2T1, the voltage component of the DC stored at the smoothing capacitor 2C is stored at the first capacitor Cdc1.

There is a diode Do installed between the coil 2L and the first capacitor Cdc1 in the power factor correction circuit 14 for shutting off reverse current from the first capacitor Cdc1 to the coil 2L.

The voltage sensor 230 senses the voltage applied from the AC input unit 201 to the PFC unit 200 to apply transforming control signals BS generated in accordance with the sensed voltage to a first transistor 27T1 of the PFC unit 200 and to the DC/DC converter 210 as well. Accordingly, the output voltage of the PFC unit 200 varies according to the transforming control signal BS applied to the first transistor 2T1.

For example, the transforming control signal BS gets the PFC unit 200 to output DC 200V in case that the input voltage of the PFC unit 200 is AC 110V, and DC 400V in case that the input voltage of the PFC unit 200 is AC 220V.

In this way, the voltage sensor 230 senses the variation of the voltage applied from the AC input unit 201 to the PFC unit 200 to vary the output voltage of the PFC unit 200 into a predetermined uniform value.

Figure 27:
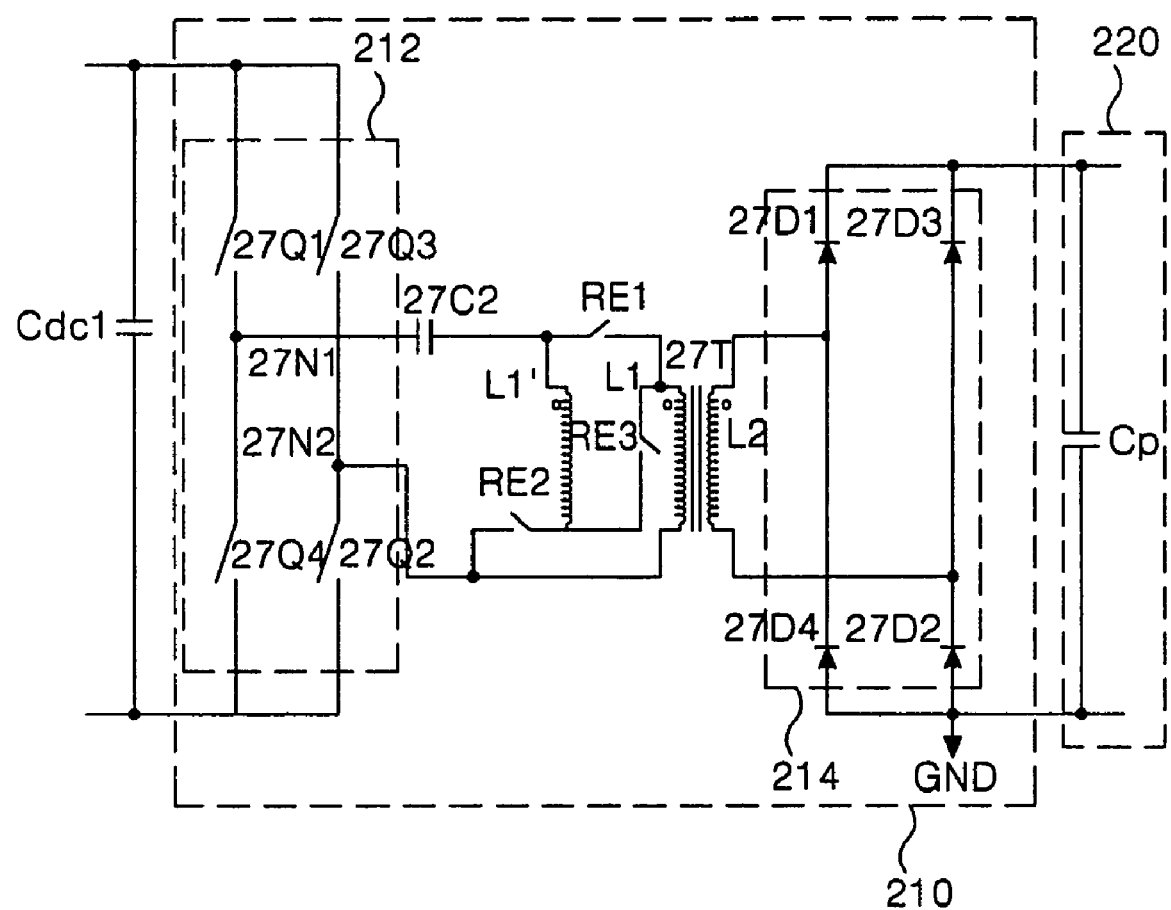
FIG. 27 illustrates a circuit diagram of a sustaining pulse generator of the PDP according to the eleventh embodiment of the present invention.

Referring to FIG. 27, the DC/DC converter 210 according to the eleventh embodiment of the present invention includes a bridge switch 212 connected to both ends of the first capacitor Cdc1 stored with the output voltage of the PFC unit 200, a transformer 27T connected to the bridge switch 212 and converting the square wave applied by the switching of the bridge switch 212, a second capacitor 27C2 connected in series between the transformer 27T and the bridge switch 212, and a bridge rectifier 214 of full bridge type connected to a secondary winding of the transformer 27T.

The bridge switch 212 consists of a first to a fourth switches 27Q1, 27Q2, 27Q3 and 27Q4 arranged in a full bridge type at both ends of the first capacitor Cdc1.

The first and third switches 27Q1 and 27Q3 are connected in parallel with one end of the first capacitor Cdc1, and the second and fourth switches 27Q2 and 27Q4 are connected in parallel with the other end of the first capacitor Cdc1. Herein, the first to fourth switches 27Q1, 27Q2, 27Q3 and 27Q4 are Field Effect Transistors FET.

There are a first node 27N1 connected to the first and fourth switches 27Q1 and 27Q4, and a second node 27N2 connected to the second and third switches 27Q2 and 27Q3. The first node 27N1 is connected to the upper end of a primary winding of the transformer 27T through the second capacitor 27C2, and the second node 27N2 is connected to the lower end of the primary winding of the transformer 27T. Herein, the first and second switches 27Q1 and 27Q2 are switched at the same time, or the second switch 27Q2 is switched after the first switch 27Q1 is switched. The third and fourth switches 27Q3 and 27Q4 are switched at the same time, or the fourth switch 27Q4 is switched after the third switch 27Q3 is switched.

The second capacitor 27C2 is a DC blocking capacitor for preventing a current with a DC component applied to the transformer 27T via the bridge switch 212.

The bridge switch 212 converts the voltage applied from the first capacitor Cdc1 by the alternate switching of the first to fourth switches 27Q1, 27Q2, 27Q3 and 27Q4 to square wave to apply to the primary winding of the transformer 27T.

The transformer 27T insulates the primary winding and the secondary winding and transforms the input voltage. In other words, the transformer 27T transforms the voltage applied to the primary winding and has the transformed voltage out to the secondary winding by a turn-ratio between the primary winding and the secondary winding.

The primary winding of the transformer 27T consists of a first winding L1 and an auxiliary winding L1' arranged in parallel. Further, there is a first relay RE1 arranged between one end of the first winding L1 and one end of the auxiliary winding L1' to selectively connect the first winding L1 with the auxiliary winding L1' in parallel, there is a second relay RE2 arranged between the other end of the auxiliary winding L1' and a second node 27N2, and there is a third RE3 arranged between the one end of the first winding L1 and the other end of the auxiliary winding L1' to connect the first winding L1 with the auxiliary winding L1' in series.

The first to third relays RE1, RE2 and RE3 are each operated by the transforming control signal applied from the voltage sensor 230. At this moment, the first relay RE1 and the second relay RE2 are simultaneously operated.

The primary winding of the transformer 27T has the first winding L1 and the auxiliary winding L1' connected in parallel in case that the first and second relays RE1 and RE2 are operated at the same time by the transforming control signal BS. Further, the first winding L1 and the auxiliary winding L1' are connected in series in case that the third relay RE3 is only operated by the transforming control signal BS. Herein, the first winding L1 his the same turn as the auxiliary winding L1'.

The voltage induced to the-secondary winding L2 of the transformer 27T is the same when the first and second relays RE1 and RE2 are operated together as when the third relay RE3 is only operated. Accordingly, the voltage induced to the secondary winding L2 of the transformer 27T is set uniform and controls the turn of the primary winding.

For instance, in case that the output voltage of the PFC unit 200 is sensed by the voltage sensor 230 as DC 100V, the first and second relays RE1 and RE2 are operated together by the transforming control signal BS. While, in case of DC 220V, the first and second relay RE1 and RE2 are not operated, but the third relay RE3 is operated. That is, the turn-ratio of the transformer 27T is two times as much when DC 110V is inputted as when DC 220V is inputted.

The bridge rectifier 214 includes a first diode to a fourth diode 27D1, 27D2, 27D3 and 27D4 connected in a full bridge type to both ends of the secondary winding of the transformer 27T in order to rectify the AC pulse generated on the secondary winding of the transformer 27T.

The first and second diodes 27D1 and 27D2 rectifies the positive (+) AC pulses induced to the secondary winding of the transformer 27T into positive sustaining pulses. The third and fourth diodes 27D3 and 27D4 rectifies the negative (−) AC pulses induced to the secondary winding of the transformer 27T into positive sustaining pulses The positive sustaining pulses rectified by the bridge rectifier 214 are applied to a panel capacitor Cp.

The operation of the sustaining pulse generator of the PDP according to the eleventh embodiment of the present invention is described as follows.

The AC input applied from the AC input unit 201 has its harmonics and power factor improved by the PFC unit 200 to be outputted as DC voltage. The DC voltage outputted from the PFC unit 200 has its voltage regulation sensed by the voltage sensor 230 and the output DC voltage of the PFC unit 200 varies in accordance with the sensed voltage to the DC/DC converter 210. At this moment, it is assumed that the primary winding of the transformer 27T has the first winding L1 and the auxiliary winding L1' connected in series by the transforming control signal BS applied from the voltage sensor 230.

The first capacitor Cdc1 is stored with the DC voltage applied to the DC/DC converter 210. After the first switch 27Q1 is turned on by a switching control signal, the second switch 27Q2 is turned on so that the voltage stored at the first capacitor Cdc1 flows via the first switch 27Q1, the second capacitor 27C2, the primary winding of the transformer 27T, which is connected in series when the first relay RE1 and the second relay RE2 are operated together, and the second switch 27Q2. Accordingly, the voltage stored at the first capacitor Cdc1 is made to induce a positive voltage +SUS to the secondary winding of the transformer 27T. The positive voltage +SUS induced to the secondary winding is rectified into a positive sustaining pulse Vcp by the first and second diodes 27D1 and 27D2 and applied to the panel capacitor Cp.

Subsequently, the first and second switches 27Q1 and 27Q2 are turned off, then the third switch 27Q3 is turned on by a switching control signal, then the fourth switch 27Q4 is turned on. With this, the voltage of the first capacitor Cdc1 flows the third switch 27Q3, the second capacitor 27C2, the primary winding of the transformer 27T, which is connected in series when the first relay RE1 and the second relay RE2 are operated together, and the fourth switch 27Q4. Accordingly, the voltage stored at the first capacitor Cdc1 is made to induce a negative voltage −SUS to the secondary winding of the transformer 27T. The negative voltage −SUS induced to the secondary winding is rectified into a positive sustaining pulse Vcp by the third and fourth diodes 27D3 and 27D4 and applied to the panel capacitor Cp.

On the other hand, the modification of the turn-ratio of the primary winding and the secondary winding of the transformer 27T is not limited to the primary winding of the transformer 27T1, but the first to third relays RE1, RE2 and RE3 may be connected to make the secondary winding of the transformer 27T connected in parallel or in series. In other words, the secondary winding of the transformer 37T may consist of a first winding and an auxiliary winding. At this moment, the turn of the first and auxiliary windings may be the same or different.

Figure 28:
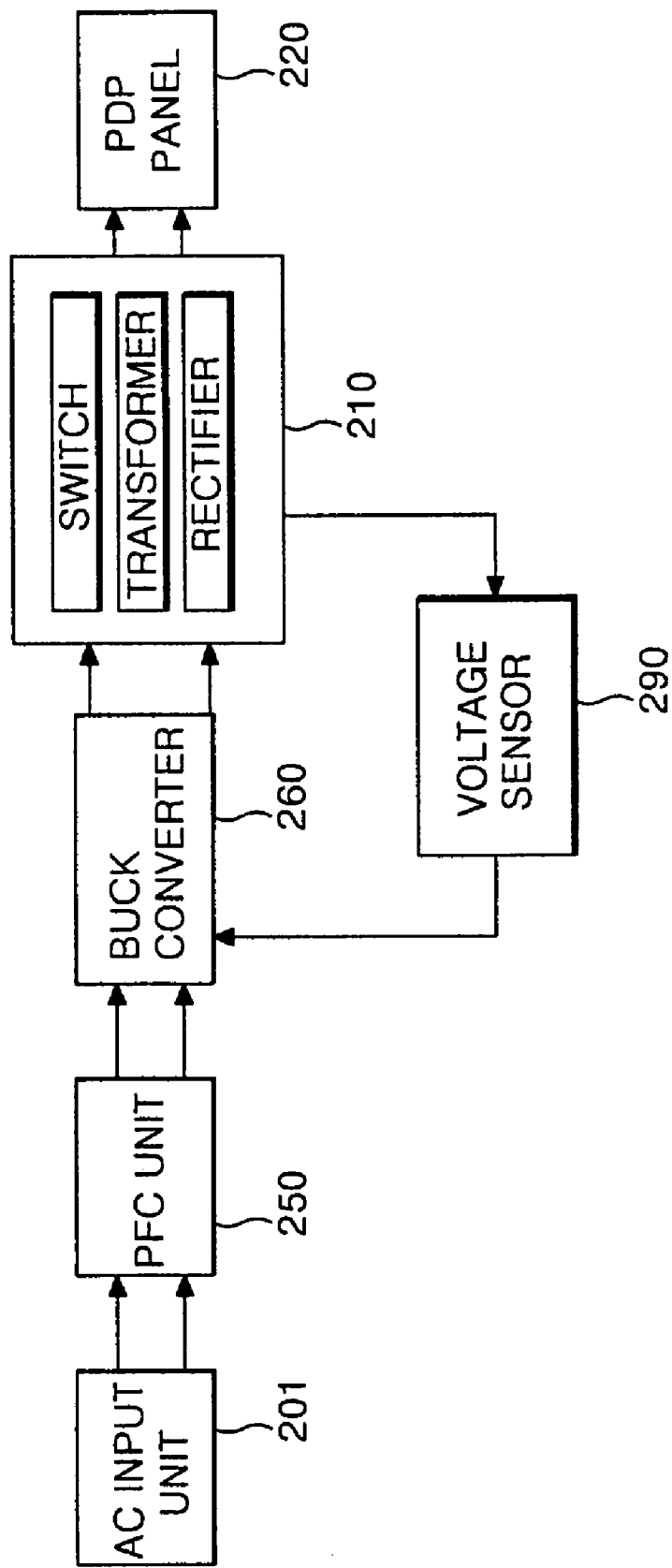
FIG. 28 illustrates a block diagram of a sustaining pulse generator of the PDP according to the twelfth embodiment of the present invention.

Referring to FIG. 28, a sustaining pulse generator according to the twelfth embodiment of the present invention includes an AC input unit 251 applying AC voltage; a power fact or correction PFC unit 250 improving power factor of the voltage applied from the AC input unit 251 and eliminating harmonics; a DC/DC converter 270 converting the DC voltage generated at the PFC unit 250 into square wave, transforming it, rectifying it, and then applying it to a PDP panel 280; a buck converter disposed between the PFC unit 250 and the DC/DC converter 270 and stabilizing the voltage applied from the PFC unit 250 to the DC/DC converter 270 at a uniform voltage; and a voltage sensor sensing the level of the output voltage of the DC/DC converter 210 to control the buck converter 260.

The PFC unit 250 controls input current from the AC input unit 251 to generate sine waves with the same phases, improve power factor and at the same time eliminate harmonics noise.

To this end, the PFC unit 250, as in FIG. 6A, includes a rectifying circuit 12 rectifying the AC inputted from the AC input unit 251 to DC, and a power factor correction circuit 14 improving the power factor of the DC rectified at the rectifying circuit 12.

The rectifying circuit 12 includes a first diode DF1 and a second diode DF2 arranged in a full bridge type and being forward biased during a positive (+) half period of the inputted AC, and a third diode DF3 and a fourth diode DF4 being forward biased during a negative (−) half period. The rectifying circuit 12 does full wave rectification to the AC inputted from the AC input unit 251 and stores the produced DC at a smoothing capacitor 2C.

The power factor correction circuit 14 includes a coil 2L being charged with a current component of the DC stored at the smoothing capacitor 2C of the rectifying circuit 12, a first transistor 2T1 installed between the coil 2L and the rectifying circuit 12 and switching for the current component of the DC to be stored at the coil 2L, and a first capacitor Cdc1 being charged with a voltage component of the DC applied from the smoothing capacitor 2C by switching of the first transistor 2T1.

When a control signal (not shown) turns on the first transistor 2T1, there is a loop formed between the smoothing capacitor 2C, the first transistor 2T1 and the coil 2L and the current component of the DC is stored at the coil 2L. Further, when the control signal (not shown) turns off the first transistor 2T1 the voltage component of the DC stored at the smoothing capacitor 2C is stored at the first capacitor Cdc1.

There is a diode Do installed between the coil 2L and the first capacitor Cdc1 in the power factor correction circuit 14 for shutting off reverse current from the first capacitor Cdc1 to the coil 2L.

Figure 29:
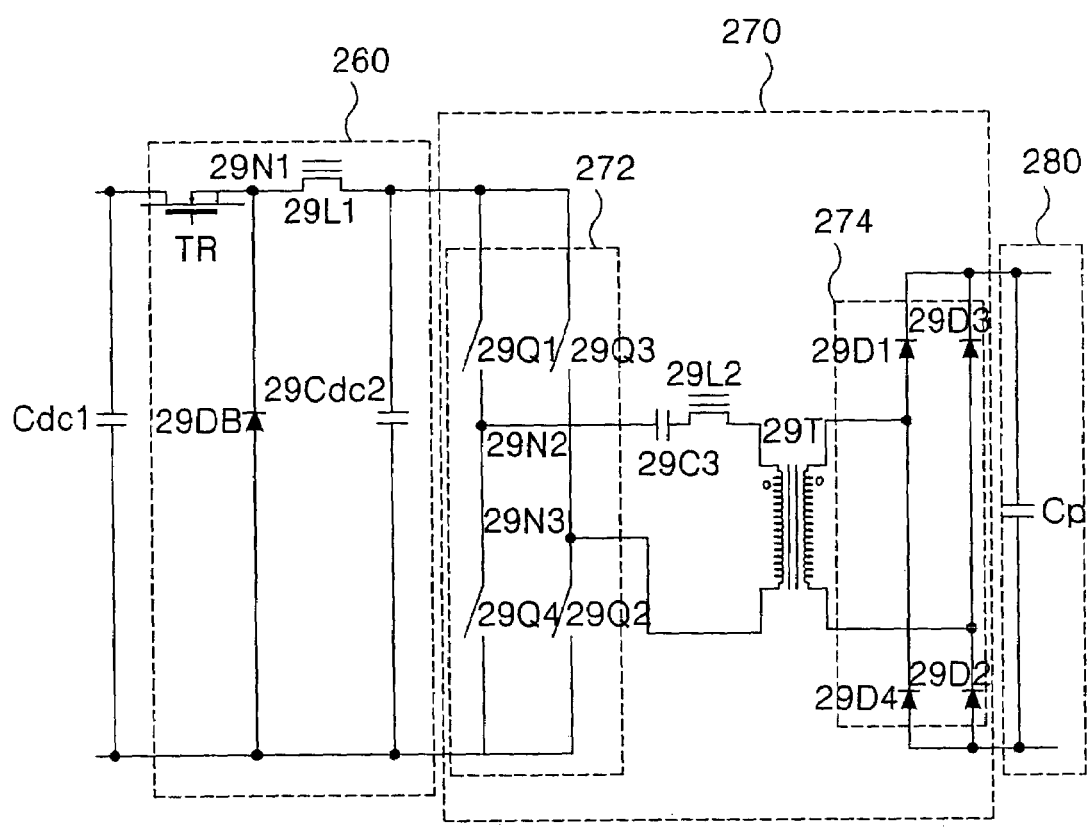
FIG. 29 illustrates a circuit diagram of a sustaining pulse generator of the PDP according to the twelfth embodiment of the present invention.

Referring to FIG. 29, the buck converter 260 includes a transistor TR and a first inductor 29L1 arranged at one end of the first capacitor Cdc1 in series; a diode 29DB arranged between the other end of the first capacitor Cdc1 and a first node 29N1, which is connected between the transistor TR and the first inductor 29L1; a second capacitor 29Cdc2 arranged between the first inductor L1 and the diode 29DB.

The first capacitor Cdc1 is stored with the voltage outputted from the PFC unit 250. The transistor TR switches the voltage inputted from the first capacitor Cdc1 to the first inductor 29L1 in accordance with a voltage detection signal of the voltage sensor 290. The first inductor 29L1 smoothes the voltage inputted by switching the transistor TR. The diode 29DB is a free wheeling diode that forms a closed loop of the current flowing in the inductor 29L1 when the transistor TR is in an off-state. The second capacitor 29Cdc2 is charged with the voltage inputted through the first inductor 29L1.

To describe more particularly, the buck converter 260 charges the input voltage from the first capacitor Cdc1 to the second capacitor 29Cdc2 through the first inductor 29L1 when the transistor is turned on by the voltage detection signal. Whereas, the voltage flowing in the first inductor 29L1 forms a current loop through the second capacitor 29Cdc2 and the diode 29DB when the transistor is turned off. Accordingly, the input voltage of the buck converter 260 is lower than the output voltage, the output voltage is stabilized at a uniform voltage.

The voltage sensor 290 senses the level of the voltage of the transformer 29T described later and generates a voltage detection signal for the sensed voltage to apply to the buck converter 260. In other words, the voltage detection signal controls the switching of the transistor TR of the buck converter 260 in order to stabilize the voltage applied to the primary winding of the transformer 29T at a uniform voltage.

The DC/DC converter 270 includes a bridge switch 272 connected to both ends of the second capacitor Cdc2 stored with the output voltage of the buck converter 260, a transformer 29T connected to the bridge switch 272 and converting the voltage of the square wave applied by the switching of the bridge switch 272, a third capacitor 27C3 connected in series between the transformer 29T and the bridge switch 272, and a bridge rectifier 274 of full bridge type connected to a secondary winding of the transformer 29T.

The bridge switch 272 consists of a first to a fourth switches 29Q1, 29Q2, 29Q3 and 29Q4 arranged in a full bridge type at both ends of the second capacitor 29Cdc2.

The first and third switches 29Q1 and 29Q3 are connected in parallel with one end of the second capacitor 29Cdc2, and the second and fourth switches 29Q2 and 29Q4 are connected in parallel with the other end of the second capacitor 29Cdc2. Herein, the first to fourth switches 29Q1, 29Q2, 29Q3 and 29Q4 are Field Effect Transistors FET.

There are a second node 29N2 connected to the first and fourth switches 29Q1 and 29Q4, and a third node 29N3 connected to the second and third switches 29Q2 and 29Q3. The second node 29N2 is connected to the upper end of a primary winding of the transformer 29T through the third capacitor 27C3 and the second inductor 29L2, and the third node 29N3 is connected to the lower end of the primary winding of the transformer 29T. Herein, the first and second switches 29Q1 and 29Q2 are switched at the same time, or the second switch 29Q2 is switched after the first switch 29Q1 is switched. Also, the third and fourth switches 29Q3 and 29Q4 are switched at the same time, or the fourth switch 29Q4 is switched after the third switch 29Q3 is switched.

Such a bridge switch 272 converts the voltage applied from the second capacitor 29Cdc2 by the alternate switching of the first to fourth switches 29Q1, 29Q2, 29Q3 and 29Q4 into square wave to apply to the primary winding of the transformer 29T.

The third capacitor 29C3 is a DC blocking capacitor for preventing a current with a DC component applied to the transformer 29T via the bridge switch 272.

The second inductor 29L2 is a resonant coil for eliminating switching loss of the first to fourth switches 29Q1, 29Q2, 29Q3 and 29Q4 of the bridge switch 272.

The transformer 29T insulates the primary winding and the secondary winding and transforms the input voltage. In other words, the transformer 29T transforms the voltage applied to the primary winding and has the transformed voltage out to the secondary winding by a turn-ratio between the primary winding and the secondary winding. One end of the primary winding of the transformer 29T is connected to the second inductor 29L2 and the other end of the primary winding to the third node 29N3.

The bridge rectifier 274 includes a first diode to a fourth diode 29D1, 29D2, 29D3 and 29D4 connected in a full bridge type to both ends of the secondary winding of the transformer 29T in order to rectify the polarity of the AC pulse induced to the secondary winding of the transformer 29T.

The first and second diodes 29D1 and 29D2 rectifies the positive (+) AC pulses induced to the secondary winding of the transformer 29T into positive sustaining pulses. The third and fourth diodes 29D3 and 29D4 rectifies the negative (−) AC pulses induced to the secondary winding of the transformer 29T into positive sustaining pulses. The positive sustaining pulses rectified by the bridge rectifier 274 are applied to a panel capacitor Cp.

The operation of the sustaining pulse generator of the PDP according to the twelfth embodiment of the present invention is described as follows.

The AC input applied from the AC input unit 251 has its harmonics and power factor improved by the PFC unit 250 to be outputted as DC voltage. The voltage outputted from the PFC unit 250 is applied to the buck converter 260, and then is stabilized at a uniform voltage by the voltage detection signal of the voltage sensor 290. The second capacitor 29Cdc2 is stored with the output voltage of the buck converter 260, which is stabilized at a uniform voltage.

After the first switch 29Q1 is turned on by a switching control signal, the second switch 29Q2 is turned on so that the voltage stored at the second capacitor 29Cdc2 flows via the first switch 29Q1, the third capacitor 29C3, the second inductor 29L2, the primary winding of the transformer 29T and the second switch 29Q2. Accordingly, the voltage stored at the second capacitor 29Cdc2 is made to induce a positive voltage +SUS to the secondary winding of the transformer 29T. The positive voltage +SUS induced to the secondary winding is rectified into a positive sustaining pulse Vcp by the first and second diodes 29D1 and 29D2 and applied to the panel capacitor Cp.

Subsequently, the first and second switches 29Q1 and 29Q2 are turned off, then the third switch 29Q3 is turned on by a switching control signal, then the fourth switch 29Q4 is turned on. With this, the voltage of the second capacitor 29Cdc2 flows the third switch 29Q3, the primary winding of the transformer 29T, the second inductor 29L2, the third capacitor 29C3 and the fourth switch 29Q4. Accordingly, the voltage stored at the second capacitor 29Cdc2 is made to induce a negative voltage −SUS to the secondary winding of the transformer 29T. The negative voltage −SUS induced to the secondary winding is rectified into a positive sustaining pulse Vcp by the third and fourth diodes 29D3 and 29D4 and applied to the panel capacitor Cp.

In the sustaining pulse generator of the PDP according to the twelfth embodiment of the present invention, the DC/DC converter, as in the first to eleventh embodiments of the present invention, may be connected to the buck converter 260.

Figure 30:
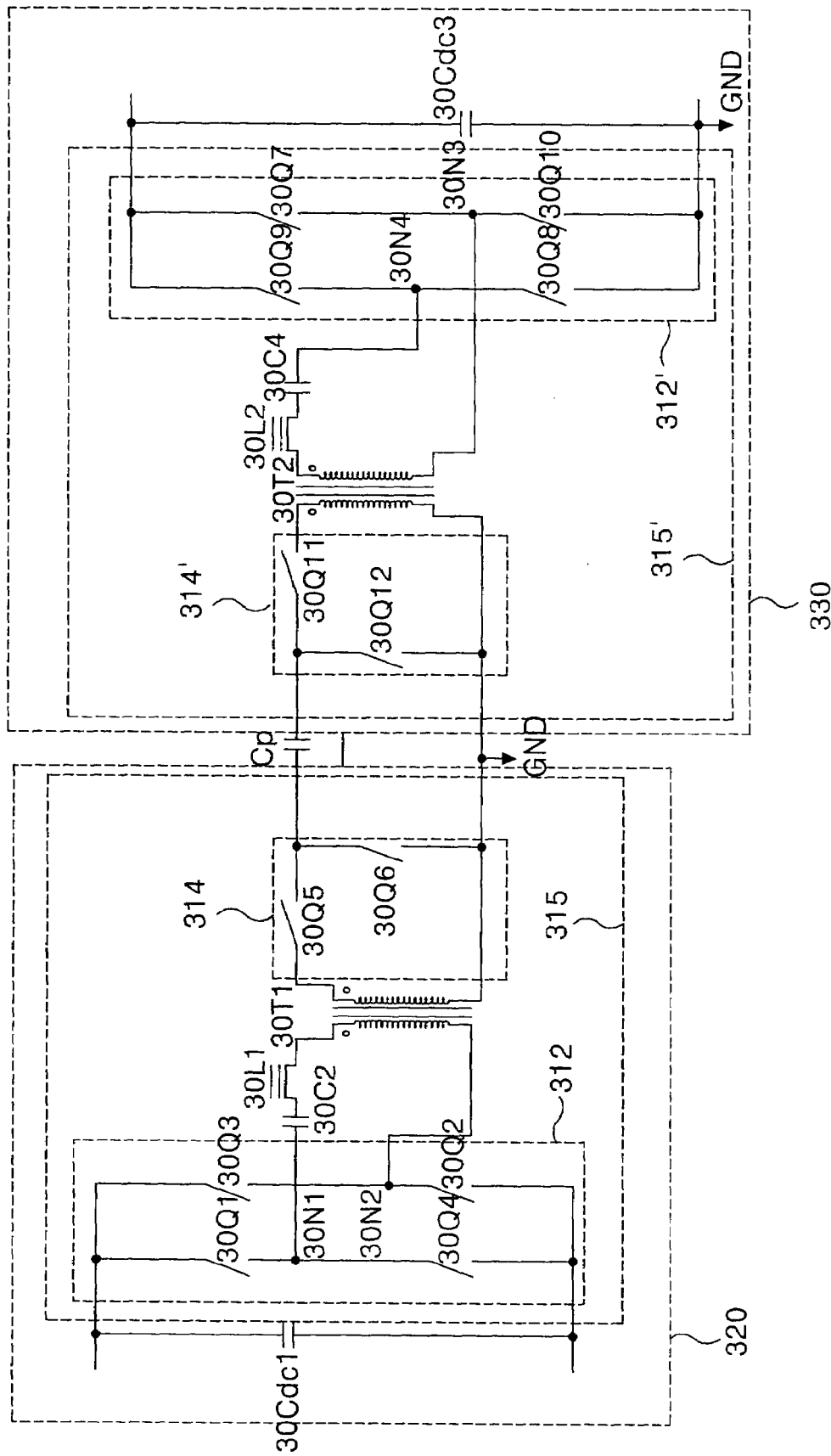
FIG. 30 illustrates a circuit diagram of a sustaining pulse generator of the PDP according to the thirteenth embodiment of the present invention.

Referring to FIG. 30, a sustaining pulse generator according to the thirteenth embodiment of the present invention includes a Y driver 320 connected to one end of a panel capacitor Cp and applying a first sustaining pulse of three steps; a Z driver 330 connected to the other end of the panel capacitor Cp and applying a second sustaining pulse of three steps with an opposite phase compared to the first sustaining pulse of three steps.

The Y driver 320 includes a first capacitor 30Cdc1 stored with a voltage outputted from a PFC unit; and a first DC/DC converter 315 converting the DC voltage applied from the first capacitor 30Cdc1 into square wave, transforming it, rectifying it, and then applying it to the panel capacitor Cp.

The voltage applied from an AC input unit 201 has its harmonics eliminated and power factor improved by the PFC unit 250 to be stored at the first capacitor 30Cdc1.

The first DC/DC converter 315 includes a first bridge switch 312 connected to both ends of the first capacitor 30Cdc1, a first transformer 30T1 connected to the first bridge switch 312 and converting the square wave applied by the switching of the first bridge switch 312, a second capacitor 30C2 and a first inductor 30L1 connected in series between the first transformer 30T1 and the first bridge switch 312, and a first rectifier circuit 314 disposed between a secondary winding of the first transformer 30T1 and the panel capacitor Cp.

The first bridge switch 312 consists of a first to a fourth switches 30Q1, 30Q2, 30Q3 and 30Q4 arranged in a full bridge type at both ends of the first capacitor 30Cdc1.

The first and third switches 30Q1 and 30Q3 are connected in parallel with one end of the first capacitor 30Cdc1, and the second and fourth switches 30Q2 and 30Q4 are connected in parallel with the other end of the first capacitor 30Cdc1.

Herein, the first to fourth switches 30Q1, 30Q2, 30Q3 and 30Q4 are Field Effect Transistors FET.

There are a first node 30N1 connected to the first and fourth switches 30Q1 and 30Q4, and a second node 30N2 connected to the second and third switches 30Q2 and 30Q3. The first node 30N1 is connected to the upper end of a primary winding of the first transformer 30T1 through the second capacitor 30C2 and the first inductor 30L1, and the second node 30N2 is connected to the lower end of the primary winding of the first transformer 30T1.

Such a first bridge switch 312 converts the voltage applied from the first capacitor 30Cdc1 by the alternate switching of the first to fourth switches 30Q1, 30Q2, 30Q3 and 30Q4 into square wave to apply to the primary winding of the first transformer 30T1.

The second capacitor 30C2 is a DC blocking capacitor for preventing a current with a DC component applied to the first transformer 30T1 via the first bridge switch 312.

The first inductor 30L1 is a resonant coil for eliminating switching loss of the first to fourth switches 30Q1, 30Q2, 30Q3 and 30Q4 of the first bridge switch 312.

The first transformer 30T1 insulates the primary winding and the secondary winding and transforms the input voltage. In other words, the first transformer 30T1 transforms the voltage applied to the primary winding and has the transformed voltage out to the secondary winding by a turn-ratio between the primary winding and the secondary winding. One end of the primary winding of the first transformer 30T1 is connected to the first inductor 30L1 and the other end of the primary winding to the second node 30N2.

The first rectifier circuit 314 includes a fifth switch 30Q5 arranged between one end of the secondary winding of the first transformer 30T1 and the panel capacitor Cp, a sixth switch 30Q6 arranged between the fifth switch 30Q5 and the other end of the secondary winding of the first transformer 30T1 in order to rectify the AC pulse induced to the secondary winding of the first transformer 30T1.

The fifth switch 30Q5 rectifies the AC signal induced to the secondary winding of the first transformer 30T1 by the switching control signal to apply to the panel capacitor Cp. The sixth switch 30Q6 discharges the voltage stored at the panel capacitor Cp to a ground voltage source GND by the switching control signal. Herein, the fifth and sixth switches 30Q5 and 30Q6 are Field Effect Transistors FET.

The Z driver 330 includes a third capacitor 30Cdc3 stored with a voltage outputted from a PFC unit; and a second DC/DC converter 315' converting the DC voltage applied from the third capacitor 30Cdc3 into square wave, transforming it, rectifying it, and then applying it to the panel capacitor Cp.

The voltage applied from an AC input unit 201 has its harmonics eliminated and power factor improved by the PFC unit 250 to be stored at the third capacitor 30Cdc3.

The second DC/DC converter 315' includes a second bridge switch 312' connected to both ends of the third capacitor 30Cdc3, a second transformer 30T2 connected to the second bridge switch 312' and converting the square wave applied by the switching of the second bridge switch 312', a fourth capacitor 30C4 and a second inductor 30L2 connected in series between the second transformer 30T2 and the second bridge switch 312', and a second rectifier circuit 314' disposed between a secondary winding of the second transformer 30T2 and the panel capacitor Cp.

The second bridge switch 312' consists of a seventh to a tenth switches 30Q7, 30Q8, 30Q9 and 30Q10 arranged in a full bridge type at both ends of the third capacitor 30Cdc3.

The seventh and ninth switches 30Q7 and 30Q9 are connected in parallel with one end of the third capacitor 30Cdc3, and the eighth and tenth switches 30Q8 and 30Q10 are connected in parallel with the other end of the third capacitor 30Cdc3. Herein, the seventh to tenth switches 30Q7, 30Q8, 30Q9 and 30Q10 are Field Effect Transistors FET.

There are a fourth node 30N4 connected to the eighth and ninth switches 30Q8 and 30Q9, and a third node 30N3 connected to the seventh and tenth switches 30Q7 and 30Q10. The fourth node 30N4 is connected to the upper end of a primary winding of the second transformer 30T2 through the third capacitor 30C3 and the second inductor 30L2, and the third node 30N3 is connected to the lower end of the primary winding of the second transformer 30T2.

Such a second bridge switch 312' converts the voltage applied from the third capacitor 30Cdc3 by the alternate switching of the seventh to tenth switches 30Q7, 30Q8, 30Q9 and 30Q10 into square wave to apply to the primary winding of the second transformer 30T2.

The fourth capacitor 30C4 is a DC blocking capacitor for preventing a current with a DC component applied to the second transformer 30T2 via the second bridge switch 312'.

The second inductor 30L2 is a resonant coil for eliminating switching loss of the seventh to tenth switches 30Q7, 30Q8, 30Q9 and 30Q10 of the second bridge switch 312'.

The second transformer 30T2 insulates the primary winding and the secondary winding and transforms the input voltage. In other words, the second transformer 30T2 transforms the voltage applied to the primary winding and has the transformed voltage out to the secondary winding by a turn-ratio between the primary winding and the secondary winding. One end of the primary winding of the second transformer 30T2 is connected to the second inductor 30L2 and the other end of the primary winding to the third node 30N3.

The second rectifier circuit 314' includes a eleventh switch 30Q11 arranged between one end of the secondary winding of the second transformer 30T2 and the panel capacitor Cp, a twelfth switch 30Q12 arranged between the eleventh switch 30Q11 and the other end of the secondary winding of the second transformer 30T2 in order to rectify the AC pulse induced to the secondary winding of the second transformer 30T2.

The eleventh switch 30Q11 rectifies the AC signal induced to the secondary winding of the second transformer 30T2 by the switching control signal to apply to the panel capacitor Cp. The twelfth switch 30Q12 discharges the voltage stored at the panel capacitor Cp to a ground voltage source GND by the switching control signal. Herein, the eleventh and twelfth switches 30Q11 and 30Q12 are Field Effect Transistors FET.

Figure 31:
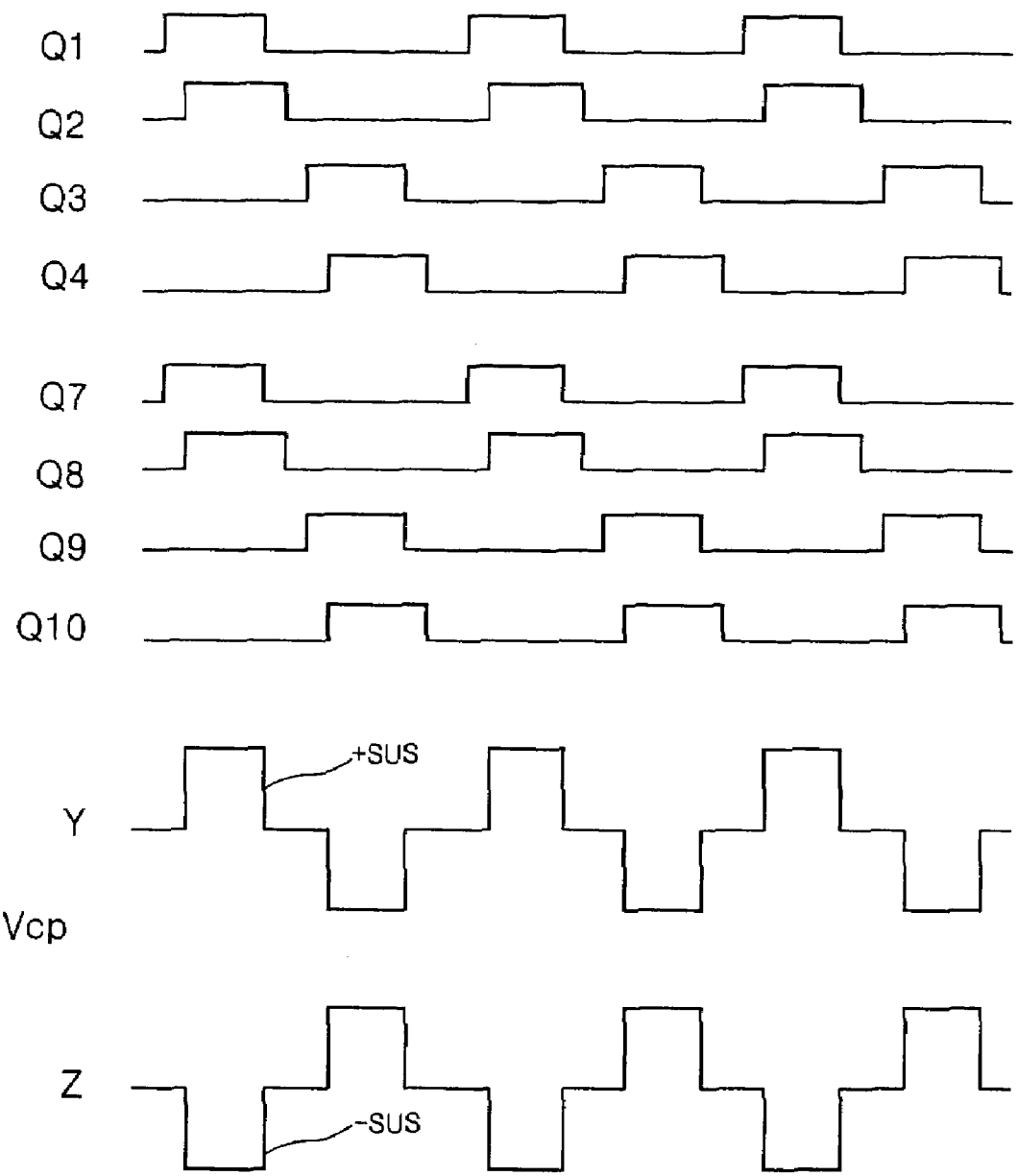
FIG. 31 illustrates a driving waveform diagram of the sustaining pulse generator of the PDP shown in FIG. 30.

The operation of the sustaining pulse generator of the PDP according to the thirteenth embodiment of the present invention is described as follows in conjunction with FIG. 31.

After the first switch 30Q1 of the Y driver 320 is turned on by a switching control signal, the second switch 30Q2 is turned on so that the voltage of the first capacitor 30Cdc1 flows via the first switch 30Q1, the second capacitor 30C2, the first inductor 30L1, the primary winding of the first transformer 30T1 and the second switch 30Q2. Accordingly, the voltage stored at the first capacitor 30Cdc1 is made to induce a positive voltage +SUS to the secondary winding of the first transformer 30T1. The positive voltage +SUS induced to the secondary winding is applied to the panel capacitor Cp by the switching of the fifth switch 30Q5.

At the same time, after the seventh switch 30Q7 of the Z driver 330 is turned on by a switching control signal, the eighth switch 30Q8 is turned on so that the voltage of the third capacitor 30Cdc3 flows via the seventh switch 30Q7, the primary winding of the second transformer 30T2, the second inductor 30L2, the fourth capacitor 30C4 and the eighth switch 30Q8. Accordingly, the voltage stored at the third capacitor 30Cdc3 is made to induce a negative voltage −SUS to the secondary winding of the second transformer 30T2. The negative voltage −SUS induced to the secondary winding is applied to the panel capacitor Cp by the switching of the eleventh switch 30Q11.

Subsequently, if the first and second switches 30Q1 and 30Q2 of the Y driver 320 are turned off, and at the same time the seventh and eighth switches 30Q7 and 30Q8 of the Z driver 330 are also turned off, the sixth switch 30Q6 and the twelfth switch 30Q12 are turned on by the switching control signal to discharge the voltage stored at the panel capacitor Cp to a ground voltage source GND.

And then, after third switch 30Q3 of the Y driver 320 is turned on by the switching control signal, the fourth switch 30Q4 is turned on. With this, the voltage of the first capacitor 30Cdc1 flows the third switch 30Q3, the primary winding of the first transformer 30T1, the first inductor 30L1, the second capacitor 30C2 and the fourth switch 30Q4. Accordingly, the voltage stored at the first capacitor 30Cdc1 is made to induce a negative voltage −SUS to the secondary winding of the first transformer 30T1. The negative voltage −SUS induced to the secondary winding is applied to the panel capacitor Cp by the switching of the fifth switch 30Q5.

At the same time, after the ninth switch 30Q9 of the Z driver 330 is turned on by a switching control signal, the tenth switch 30Q10 is turned on so that the voltage of the third capacitor 30Cdc3 flows via the ninth switch 30Q9, the fourth capacitor 30C4, the second inductor 30L2, the primary winding of the second transformer 30T2 and the tenth switch 30Q10. Accordingly, the voltage stored at the third capacitor 30Cdc3 is made to induce a positive voltage +SUS to the secondary winding of the second transformer 30T2. The positive voltage +SUS induced to the secondary winding is applied to the panel capacitor Cp by the switching of the eleventh switch 30Q11.

Subsequently, if the first and second switches 30Q1 and 30Q2 of the Y driver 320 are turned off, and at the same time the seventh and eighth switches 30Q7 and 30Q8 of the Z driver 330 are also turned off, the sixth switch 30Q6 and the twelfth switch 30Q12 are turned on by the switching control signal to discharge the voltage stored at the panel capacitor Cp to a ground voltage source GND.

It may be possible to reduce the voltage of the sustaining pulse of the PDP panel by applying the sustaining pulse with three steps, i.e., a positive potential +SUS, a ground potential 0V and a negative potential −SUS, which are having an opposite phase to one another.

As described above, the sustaining pulse generator of the plasma display panel according to the embodiments of the present invention has its circuit configuration simplified by integrating the DC/DC converter and the sustaining pulse generator of the related art. Accordingly, it may be possible to minimize the circuit loss occurring in the course of converting the AC power source into the sustaining pulse and to reduce the heat and power consumption generated in the plasma display panel due to the circuit loss.

Although the present invention has been explained by the embodiments shown in the drawings described above, it should be understood to the ordinary skilled person in the art that the invention is not limited to the embodiments, but rather that various changes or modifications thereof are possible without departing from the spirit of the invention. Accordingly, the scope of the invention shall be determined only by the appended claims and their equivalents.

What is claimed is:

1. A sustaining pulse generator of a plasma display panel (PDP), comprising:
    a direct current (DC) converter for converting an alternate current (AC) voltage to a direct current (DC) voltage;
    a sensor for sensing a level of the AC voltage;
    a switching part for converting the DC voltage into a square wave;
    a transformer for inducing the square wave to an output terminal thereof;
    a controller for controlling a turn-ratio of the transformer in accordance with the sensed AC voltage level; and
    a rectifier for rectifying the square wave induced to the output terminal and for generating and applying a sustaining pulse to the PDP, wherein the PDP includes a plurality of scan electrodes and sustain electrodes in a first direction, a plurality of address electrodes in a second direction, the first direction being different from the second direction, a plurality of cells, each cell having scan, sustain and address electrodes, wherein the sustaining pulse is provided to the scan and sustain electrodes.

2. The sustaining pulse generator of the PDP according to claim 1, wherein the DC converter includes:
    a plurality of diodes connected between an input power source and the switching part in a bridge type;
    a first capacitor connected between the diodes of a bridge type and the switching part;
    a power factor correction circuit connected between the first capacitor and the switching part; and
    a second capacitor connected between the power factor correction circuit and the switching part.

3. The sustaining pulse generator of the PDP according to claim 1, wherein the transformer includes an auxiliary winding.

4. The sustaining pulse generator of the PDP according to claim 3, wherein the auxiliary winding is connected to any one between a primary winding and a secondary winding of the transformer.

5. The sustaining pulse generator of the PDP according to claim 4, wherein the controller includes:
    a first switch connected between the auxiliary winding and the primary winding;
    a second switch connected between the auxiliary winding and the switching part and being operated together with the first switch; and
    a third switch connected between the auxiliary winding and the primary winding and connecting the auxiliary winding and the primary winding in series.

6. The sustaining pulse generator of the PDP according to claim 1, wherein the controller includes:
    a first switch connected between the auxiliary winding and the secondary winding;
    a second switch connected between the auxiliary winding and the rectifier and being operated together with the first switch; and
    a third switch connected between the auxiliary winding and the secondary winding and connecting the auxiliary winding and the secondary winding in series.

7. A sustaining pulse generator of a plasma display panel (PDP), comprising:
    a sustaining driving circuit that inverts a polarity of square wave and rectifies the square wave to generate and apply a sustaining pulse of a stepped waveform to the PDP, wherein the PDP includes a plurality of scan electrodes and sustain electrodes in a first direction, a plurality of address electrodes in a second direction, the first direction being different from the second direction, a plurality of cells, each cell having scan, sustain and address electrodes, wherein the sustaining pulse is provided to the scan and sustain electrodes.

8. The sustaining pulse generator of the PDP according to claim 7, wherein the sustaining driving circuit further includes:
    a first driver connected a first electrode of a panel for applying the sustaining waveform to the first electrode; and
    a second driver connected a second electrode of the panel for applying a sustaining waveform with an opposite phase to the sustaining waveform to the second electrode.

9. The sustaining pulse generator of the PDP according to claim 8, wherein the first driver includes:
    a first DC converter for converting AC voltage into DC voltage;
    a first switching part for switching the DC voltage to convert into square wave;
    a first transformer for inducing the square wave to an output terminal thereof; and
    a first rectifier for rectifying the square wave induced to the output terminal to apply to the first electrode of the panel.

10. The sustaining pulse generator of the PDP according to claim 8, wherein the second driver includes:
    a second DC converter for converting AC voltage into DC voltage;
    a second switching part for switching the DC voltage to convert into square wave;
    a second transformer for inducing the square wave to an output terminal thereof; and
    a second rectifier for rectifying the square wave induced to the output terminal to apply to the second electrode of the panel.

11. The sustaining pulse generator of the PDP according to claim 7, wherein the sustaining pulse of the stepped waveform has a positive potential, a ground potential and a negative potential.

12. The sustaining pulse generator of the PDP according to claim 1, wherein the rectifier includes a plurality of diodes connected between the transformer and the PDP in a bridge type, and
    wherein a first set of diodes of the plurality of diodes rectifies AC pulses having a first polarity induced to a secondary winding of the transformer into sustaining pulses having the same first polarity and a second set of the plurality of diodes rectifies AC pulses having a second polarity opposite to the first polarity induced at the secondary winding of the transformer into sustaining pulses having the first polarity.

13. The sustaining pulse generator of the PDP according to claim 1,
    wherein the rectifier includes a single diode connected between a secondary winding of the transformer and the PDP, and
    wherein the single diode rectifies voltages having a first polarity induced to the secondary winding of the transformer into sustaining pulses having the same first polarity and intercepts voltages having a second polarity opposite to the first polarity induced to the secondary winding so as not to be applied to the PDP.

14. The sustaining pulse generator of the PDP according to claim 12, wherein the plurality of diodes includes first, second, third and fourth diodes,
and the first set of diodes includes the first and second diodes and the second set of diodes includes the third and fourth diodes.

15. The sustaining pulse generator of the PDP according to claim 12, wherein the first polarity comprises a positive polarity and the second polarity comprises a negative polarity.

16. The sustaining pulse generator of the PDP according to claim 13, wherein the first polarity comprises a positive polarity and the second polarity comprises a negative polarity.

17. The sustaining pulse generator of the PDP according to claim 1, wherein the sustaining pulse is applied directly to the PDP.

18. The sustaining pulse generator of the PDP according to claim 7, wherein the sustaining pulse is applied directly to the PDP.

19. A sustaining pulse generator of a plasma display panel (PDP) that includes a plurality of scan electrodes and sustain electrodes in a first direction, a plurality of address electrodes in a second direction different from the first direction, a plurality of cells, each cell having scan, sustain and address electrodes, the sustaining pulse generator comprising:
a sensor to sense an alternate current (AC) voltage;
a switching part to convert direct current (DC) voltage into a square wave;
a transformer to receive the square wave and to provide an output signal at an output terminal;
a controller to control a turn-ratio of the transformer based on the sensed AC voltage; and
a rectifier to rectify the square wave output at the output terminal and to apply a sustaining pulse to the scan and sustain electrodes.

20. The sustaining pulse generator of the PDP according to claim 19, further comprising:
a DC converter for converting an AC voltage to a DC voltage.

21. The sustaining pulse generator of the PDP according to claim 20, wherein the DC converter includes:
a plurality of diodes coupled between an input power source and the switching part;
a first capacitor coupled between the diodes and the switching part;
a power factor correction circuit coupled between the first capacitor and the switching part; and
a second capacitor coupled between the power factor correction circuit and the switching part.

22. The sustaining pulse generator of the PDP according to claim 19, wherein the transformer includes an auxiliary winding.

23. The sustaining pulse generator of the PDP according to claim 22, wherein the auxiliary winding is coupled to a primary winding of the transformer or to a secondary winding of the transformer.

24. The sustaining pulse generator of the PDP according to claim 23, wherein the controller includes:
a first switch coupled between the auxiliary winding and the primary winding;
a second switch coupled between the auxiliary winding and the switching part; and
a third switch coupled between the auxiliary winding and the primary winding and coupling the auxiliary winding and the primary winding in series.

25. The sustaining pulse generator of the PDP according to claim 19, wherein the rectifier includes a plurality of diodes coupled as a bridge, and wherein a first set of diodes of the plurality of diodes rectifies AC pulses having a first polarity induced to a secondary winding of the transformer into sustaining pulses having a same first polarity and a second set of the plurality of diodes rectifies AC pulses having a second polarity opposite to the first polarity induced at the secondary winding of the transformer into sustaining pulses having the first polarity.

26. The sustaining pulse generator of the PDP according to claim 22, wherein the plurality of diodes includes first, second, third and fourth diodes, and the first set of diodes includes the first and second diodes and the second set of diodes includes the third and fourth diodes.

27. The sustaining pulse generator of the PDP according to claim 22, wherein the first polarity comprises a positive polarity and the second polarity comprises a negative polarity.

28. The sustaining pulse generator of the PDP according to claim 19,
wherein the rectifier includes a single diode coupled between a secondary winding of the transformer and the PDP, and
wherein the single diode rectifies voltages having a first polarity induced to the secondary winding of the transformer into sustaining pulses having a same first polarity and intercepts voltages having a second polarity opposite to the first polarity induced to the secondary winding so as not to be applied to the PDP.

29. The sustaining pulse generator of the PDP according to claim 28, wherein the first polarity comprises a positive polarity and the second polarity comprises a negative polarity.

30. The sustaining pulse generator of the PDP according to claim 19, wherein the sustaining pulse is applied directly to the PDP.

* * * * *